(12) United States Patent
Allione et al.

(10) Patent No.: US 10,871,658 B2
(45) Date of Patent: Dec. 22, 2020

(54) METHOD FOR MODIFYING A NON-DIOPTRIC PARAMETER OF AN OPTICAL SYSTEM

(71) Applicant: Essilor International, Charenton-le-Pont (FR)

(72) Inventors: Pascal Allione, Charenton-le-Pont (FR); Celine Benoit, Charenton-le-Pont (FR); Laurent Calixte, Charenton-le-Pont (FR); Sylvain Chene, Charenton-le-Pont (FR); Jean Sahler, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 81 days.

(21) Appl. No.: 15/568,656

(22) PCT Filed: Apr. 12, 2016

(86) PCT No.: PCT/EP2016/058033
§ 371 (c)(1),
(2) Date: Oct. 23, 2017

(87) PCT Pub. No.: WO2016/202480
PCT Pub. Date: Dec. 22, 2016

(65) Prior Publication Data
US 2018/0143452 A1 May 24, 2018

(30) Foreign Application Priority Data
Jun. 8, 2015 (EP) .................................. 15305863

(51) Int. Cl.
*G02C 7/02* (2006.01)
*G02C 7/06* (2006.01)
*G02C 7/08* (2006.01)

(52) U.S. Cl.
CPC ............ *G02C 7/028* (2013.01); *G02C 7/068* (2013.01); *G02C 7/086* (2013.01)

(58) Field of Classification Search
CPC .... G02C 7/022–028; G02C 7/061–068; G02C 7/081–086; G02C 13/005;
(Continued)

(56) References Cited

U.S. PATENT DOCUMENTS 5,733,820 A * 3/1998 Adachi .................. G01N 21/68
  216/59
6,318,859 B1 * 11/2001 Baudart ................. G02C 7/025
  351/159.42
(Continued)

FOREIGN PATENT DOCUMENTS

EP     2 270 578 A1     1/2011
EP      2270578 A1 *    1/2011   ............. G02C 7/027
(Continued)

OTHER PUBLICATIONS

International Search Report dated Sep. 21, 2016, in PCT/EP2016/058033 filed Apr. 12, 2016.
(Continued)

*Primary Examiner* — Mustak Choudhury
(74) *Attorney, Agent, or Firm* — Oblon, McClelland, Maier & Neustadt, L.L.P.

(57) ABSTRACT

A method is implemented by a computer for modifying a non-dioptric parameter of an optical system including a first and a second surface. The method includes a modifying step during which the first surface and second surface are modified so as to obtain a modified optical system such that the dioptric function of the modified optical system is substantially the same as the dioptric function of the optical system.

13 Claims, 25 Drawing Sheets

(58) Field of Classification Search
CPC ......... G02C 2202/08; G02C 7/02–7/08; G02C 7/041; G02C 7/042; G02C 7/049; G02C 7/12; G02C 7/165; G06Q 30/0633; G02B 27/0103; G02B 5/1895; G02B 5/3083; A61B 3/1035; A61F 2/1618; A61F 2/1648
USPC .... 351/158, 159.01–159.07, 159.22, 159.41, 351/159.42, 159.46, 159.53, 351/159.73–159.79, 216, 139, 246; 427/164; 118/697
See application file for complete search history.

(56) References Cited

U.S. PATENT DOCUMENTS

| | | | |
|---|---|---|---|
| 2010/0045927 A1* | 2/2010 | Moliton | G02C 7/02 351/158 |
| 2010/0105800 A1 | 4/2010 | Molenberg | |
| 2011/0085134 A1* | 4/2011 | Allione | G02C 7/024 351/159.77 |
| 2015/0253586 A1 | 9/2015 | Amir et al. | |
| 2015/0331254 A1 | 11/2015 | Guilloux | |
| 2016/0161761 A1* | 6/2016 | Quere | B29C 64/124 427/164 |

FOREIGN PATENT DOCUMENTS

| | | |
|---|---|---|
| WO | WO 2014/060552 A1 | 4/2014 |
| WO | WO 2014/102390 A1 | 7/2014 |

OTHER PUBLICATIONS

Written Opinion of the International Searching Authority dated Sep. 21, 2016, in PCT/EP2016/058033 filed Apr. 12, 2016.

* cited by examiner

METHOD FOR MODIFYING A NON-DIOPTRIC PARAMETER OF AN OPTICAL SYSTEM

FIELD OF THE INVENTION

The invention relates to a method, for example implemented by computer means, for modifying a non-dioptric parameter of an optical system, to a method of manufacturing an ophthalmic lens and to an ophthalmic lens determining device.

BACKGROUND OF THE INVENTION

Usually, a person needing to wear spectacles and having thus a prescription filled by an ophthalmologist or optometrist goes to the shop of an optician. The optician orders a pair of optical lenses corresponding to the prescription of the wearer.

The pair of optical lenses sent to the optician are designed and manufactured according to optical criteria.

Recent improvements in the field of ophthalmic lenses, have allowed providing customized optical lenses, such customization goes beyond the wearer's prescription. Further parameters than the parameters relating to the dioptric function of the optical lenses may be considered when designing and manufacturing the pair of ophthalmic lenses.

To meet new needs or specifications of the wearer, methods of optimization of optical lenses depending on the setting of segmentation/customization are usually used. Therefore, when the lens provider wants to implement product customization, he needs to compute a set of new "optical design targets" that will be used to generate the optical function to reach when optimizing the optical lens.

This method has the disadvantage of not being easily transferable to each optical design or products. Indeed, such method requires optimizing as many optical designs as existing products.

Therefore, there is a need for a method for implementing an "effective" change of an non dioptric parameter adapted to a given need of the wearer, without requiring repetitive work (design time) and optimization time of each design.

A goal of the present invention is to provide such a method.

SUMMARY OF THE INVENTION

To this end, the invention proposes a method, for example implemented by computer means, for modifying a non-dioptric parameter of an optical system comprising a first and a second surface, wherein the method comprises a modifying step during which the first surface and second surface are modified so as to obtain a modified optical system such that the dioptric function of the modified optical system is substantially the same as the dioptric function of the optical system.

Advantageously, by modifying both the first and the second surfaces during the modifying step it is possible to modify a non-dioptric parameter of the optical system without modifying the dioptric function of the optical system.

According to further embodiments which can be considered alone or in combination:
the method comprises:
an optical system data providing step (S1), during which data indicative of the optical system are provided, the data comprising at least data indicative of the first and second surface and a data indicative of the relative position of the first and second surfaces,
a modifying surface providing step (S2), during which at least one modifying surface (Smod) is provided,
a complementary modifying surface determining step (S3), during which for each at least one modifying surface (Smod) a complementary modifying surface (Sconmod) substantially identical to the at least one modifying surface (Smod) is determined,
an adding step (S5), during which the at least one modifying surface (Smod) is added to one of the surfaces of the optical system and the complementary modifying surface (Sconmod) is added to the other of the surfaces so as to obtain the modified optical system; and/or
the method further comprises:
an initial optical lens data providing step (S1), during which initial data indicative of an initial optical lens are provided, the initial data comprising at least data indicative of the front and rear surfaces of the initial optical lens associated with a first coordinate system and a data indicative of the relative position of the front and rear surfaces, said initial surfaces Sf,ini and Sr,ini comprising a plurality of surface points Pf,i and Pr,i, each surface point Pf,i and Pr,i having a mean sphere Sph(Pf,i), Sph(Pr,i) and a cylinder Cyl(Pf,i), Cyl(Pr,i), said initial optical lens having an initial dioptric function,
a modifying surface providing step (S2), during which at least one modifying surface $Smod_1$ is provided, said modifying surface $Smod_1$ being associated with a second coordinate system, and comprising a plurality of surface points $P_1, \ldots P_m$, each surface point $P_i$ having a mean sphere $Sph(P_i)$ and a cylinder $Cyl(P_i)$,
a complementary modifying surface determining step S3, during which for each modifying surface Smod1 a complementary modifying surface Sconmod1 is determined, said complementary modifying surface Sconmod1 being associated with the second coordinate system, and comprising a plurality of surface points $Pcon_1, \ldots Pcon_m$, each surface point $Pcon_i$ having a mean sphere $Sph(Pcon_i)$ and a cylinder $Cyl(Pcon_i)$, substantially equal to the mean sphere $Sph(P_i)$ and a cylinder $Cyl(P_i)$ of the corresponding points of the modifying surface,
an orientation step (S4), during which the relative position and orientation of the first coordinate system and the second coordinate system is determined,
a adding step (S5), during which the modifying surface is added to one of the front and the rear surfaces of the initial optical and the complementary modifying surface is added to the other of the front and rear surfaces so as to obtain an modified optical lens having substantially the same dioptric function as the initial optical lens; and/or
the complementary modifying surface (Sconmod) is the same as the modifying surface (Smod); and/or
the complementary modifying surface (Sconmod) is determined so that the modified optical system has the same dioptric function than the optical system; and/or
the method further comprises an optimizing step during which at least one of the modifying surface (Smod) or the complementary modifying surface (Sconmod) is modified so as the modified optical system has the same dioptric function than the optical system; and/or
the method further comprises, after the adding step (S5), a modifying evaluation step (S7) during which the at least one non-dioptric modified parameter is compared to a target value and wherein the modifying surface selection, the complementary modifying surface, the orientation and the adding steps (S2, S3, S5) are repeated so as to decrease the non-dioptric modified parameter; and/or the non-dioptric parameter is selected in a list consisting of the overall optical distortion of the optical system, local optical distortion of the optical system, the thickness of the optical system, and the geometry of at least one of the surfaces of the optical system; and/or the optical system is a semi-finished lens blank having a finished surface and a non-finished surface, the non-dioptric parameter being the geometry of the finished surface imposed to the first surface.

According to a further aspect, the invention relates to a method, for example implemented by computer means, for modifying at least one non-dioptric binocular parameter of a pair of optical lenses, wherein the non-dioptric parameter of each optical lens of the pair of optical lenses is modified using the method according to the invention.

The invention also relates to a method of manufacturing an ophthalmic lens comprising at least:
  an ophthalmic lens determining step during which the surfaces of the ophthalmic lens and relative positions of the front and rear surfaces of the ophthalmic lens are determined,
  a manufacturing step during which the ophthalmic lens is manufactured,
wherein during the ophthalmic lens determining step at least one non-dioptric parameter of the ophthalmic lens is modified according to the method of the invention.

The manufacturing step of such method of manufacturing an ophthalmic lens may further comprise a patch sticking step during which at least one transparent patch having a surface corresponding to a modifying surface or the complementary modifying surface is provided and stuck on the corresponding surface of the optical lens.

The invention also relates to an ophthalmic lens capable of correcting a user's vision and having a first major surface and a second major surface wherein the first major surface is a composite surface comprising a first surface and at least one modifying surface (Smod) and wherein the second major surface is a composite surface comprising a second surface and at least one complementary modifying surface (Sconmod), the first and second surface defining an optical system, the at least one modifying surface (Smod) and the at least one complementary modifying surface (Sconmod) being defined such that the dioptric function of the optical system is substantially the same than the dioptric function of the ophthalmic lens.

The invention further relates to an ophthalmic lens determining device adapted to implement a method according to the invention, the optical system being an ophthalmic lens, the device comprising:
  an order request receiving mean adapted to receive an ophthalmic lens order request comprising at least the wearer's ophthalmic prescription and at least one non-dioptric function of said ophthalmic lens to modify,
  a surface determining mean adapted to determine the surfaces and relative positions of said surfaces for an ophthalmic lens based on the order request,
  a modifying surface determining mean adapted to determine and provide at least one modifying surface (Smod) based on the one non-dioptric function to be modified,
  a complementary modifying surface providing mean adapted to provide at least one complementary modifying surface (Sconmod), and
  a calculation mean adapted to add the at least one modifying surface (Smod) to one of the front and the rear surfaces of the ophthalmic lens and the complementary modifying surface (Sconmod) to the other of the front and rear surfaces so as to obtain a modified ophthalmic lens having substantially the same dioptric function as the ophthalmic lens.

The ophthalmic lens determining device according to the invention may further comprises communication mean adapted to communicate with at least one distant entity to provide the modifying surface (Smod) and/or the complementary modifying surface (Sconmod).

The invention also relates to a method of providing an ophthalmic lens adapted to a wearer comprising:
  an wearer data providing step during which wearer data comprising at least the wearer's prescription, is provided,
  a dioptric design ordering step during which a dioptric design having a dioptric function corresponding at least to the wearer's prescription is ordered at a lens designer side;
  a dioptric design receiving step during which the ordered dioptric design is received;
  an ophthalmic lens modifying step during which at least one non-dioptric parameter of the ophthalmic lens corresponding to the received dioptric design is modified according to the method of the invention, the optical system being an ophthalmic lens;
  an ophthalmic lens providing step during which the modified ophthalmic lens is provided.

The invention further relates to a computer program product comprising one or more stored sequences of instructions that are accessible to a processor and which, when executed by the processor, causes the processor to carry out the steps of the methods according to the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which.

DETAILED DESCRIPTION OF PREFERRED EMBODIMENTS

Figure 1:
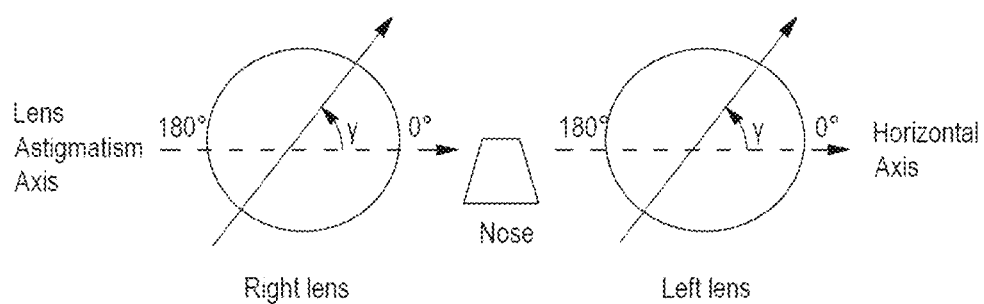
FIG. 1 illustrates the astigmatism axis γ of a lens in the TABO convention.

In the sense of the invention, the dioptric function corresponds to the optical lens power (mean power, astigmatism etc. . . . ) as a function of the gaze direction.

The wording "optical design" is a widely used wording known from the man skilled in the art in ophthalmic domain to designate the set of parameters allowing to define a dioptric function of an ophthalmic lens; each ophthalmic lens designer has its own designs, particularly for progressive ophthalmic lenses. As for an example, a progressive ophthalmic lens "design" results of an optimization of a progressive surface so as to restore a presbyope's ability to see clearly at all distances but also to optimally respect all physiological visual functions such as foveal vision, extrafoveal vision, binocular vision and to minimize unwanted astigmatisms. For example, a progressive lens design comprises:

a power profile along the main gaze directions (meridian line) used by the lens wearer during day life activities, distributions of powers (mean power, astigmatism, . . . ) on the sides of the lens, that is to say away from the main gaze direction.

These optical characteristics are part of the "designs" defined and calculated by ophthalmic lens designers and that are provided with the progressive lenses.

Although the invention is not limited to progressive lenses, the wording used is illustrated in FIGS. 1 to 10 for a progressive lens. The skilled person can adapted the definitions in case of single vision lenses.

A progressive lens comprises at least one but preferably two non-rotationally symmetrical aspheric surfaces, for instance but not limited to, progressive surface, regressive surface, toric or atoric surfaces.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in diopters.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and CURVmax is expressed in diopters.

It can be noticed that when the surface is locally spherical, the local minimum radius of curvature Rmin and the local maximum radius of curvature Rmax are the same and, accordingly, the minimum and maximum curvatures $CURV_{min}$ and CURVmax are also identical. When the surface is aspherical, the local minimum radius of curvature Rmin and the local maximum radius of curvature Rmax are different.

From these expressions of the minimum and maximum curvatures $CURV_{min}$ and $CURV_{max}$, the minimum and maximum spheres labeled $SPH_{min}$ and $SPH_{max}$ can be deduced according to the kind of surface considered.

When the surface considered is the object side surface (also referred to as the front surface), the expressions are the following:

$$SPH_{min} = (n-1)*CURV_{min} = \frac{n-1}{R_{max}} \text{ and}$$

$$SPH_{max} = (n-1)*CURV_{max} = \frac{n-1}{R_{min}}$$

where n is the index of the constituent material of the lens.

If the surface considered is an eyeball side surface (also referred to as the back surface), the expressions are the following:

$$SPH_{min} = (1-n)*CURV_{min} = \frac{1-n}{R_{max}} \text{ and}$$

$$SPH_{max} = (1-n)*CURV_{max} = \frac{1-n}{R_{min}}$$

where n is the index of the constituent material of the lens.

As is well known, a mean sphere $SPH_{mean}$ at any point on an aspherical surface can also be defined by the formula:

$$SPH_{mean} = \frac{1}{2}(SPH_{min} + SPH_{max})$$

The expression of the mean sphere therefore depends on the surface considered:
if the surface is the object side surface $$SPH_{mean} = \frac{n-1}{2}\left(\frac{1}{R_{min}} + \frac{1}{R_{max}}\right),$$

if the surface is an eyeball side surface $$SPH_{mean} = \frac{1-n}{2}\left(\frac{1}{R_{min}} + \frac{1}{R_{max}}\right),$$

A cylinder CYL is also defined by the formula $CYL=|SPH_{max}-SPH_{min}|$.

The characteristics of any aspherical face of the lens may be expressed by the local mean spheres and cylinders. A surface can be considered as locally aspherical when the cylinder is at least 0.25 diopters.

For an aspherical surface, a local cylinder axis $\gamma_{AX}$ may further be defined.

Figure 2:
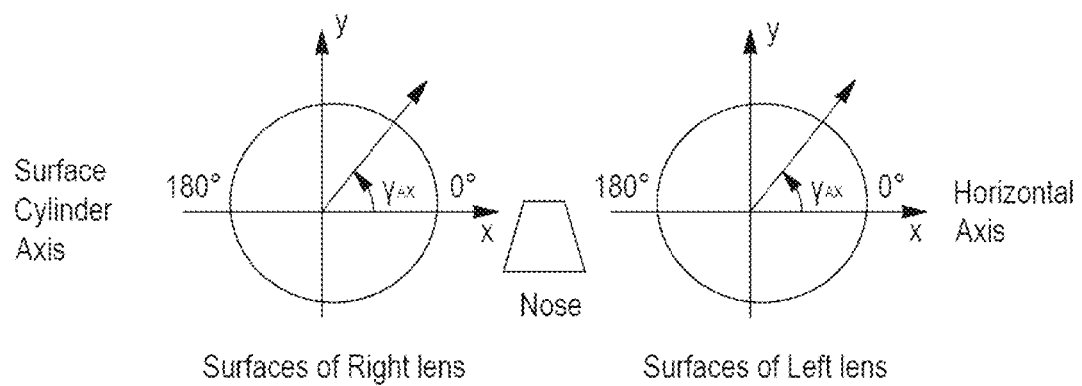
FIG. 2 illustrates the cylinder axis $\gamma_{AX}$ in a convention used to characterize an aspherical surface.

FIG. 1 illustrates the astigmatism axis γ as defined in the TABO convention and FIG. 2 illustrates the cylinder axis $\gamma_{AX}$ in a convention defined to characterize an aspherical surface.

The cylinder axis $\gamma_{AX}$ is the angle of the orientation of the maximum curvature CURVmax with relation to a reference axis and in the chosen sense of rotation. In the above defined convention, the reference axis is horizontal (the angle of this reference axis is 0°) and the sense of rotation is counter-clockwise for each eye, when looking at the wearer ($0°\leq\gamma_{AX}\leq180°$). An axis value for the cylinder axis $\gamma_{AX}$ of +45° therefore represents an axis oriented obliquely, which when looking at the wearer, extends from the quadrant located up on the right to the quadrant located down on the left.

Moreover, a progressive addition lens may also be defined by optical characteristics, taking into consideration the situation of the person wearing the lenses.

Figure 3:
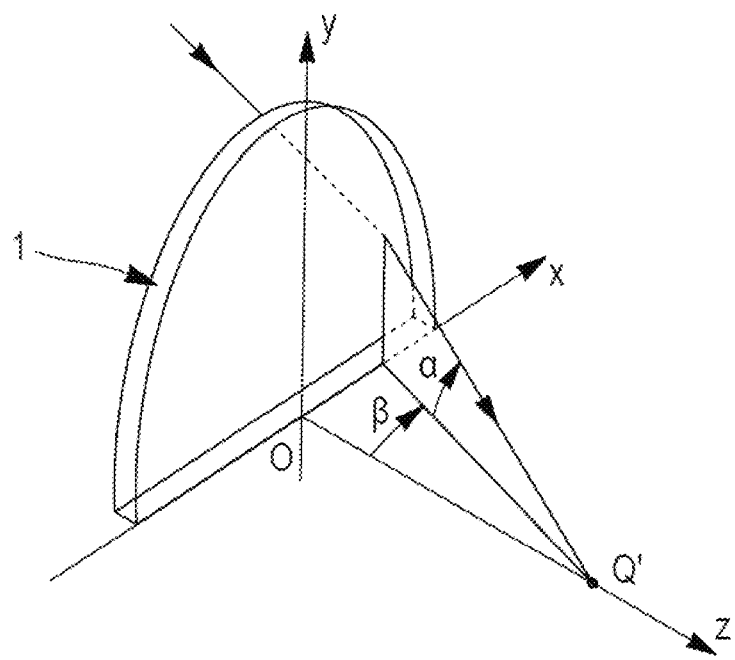
FIGS. 3 and 4 show, diagrammatically, optical systems of eye and lens.
Figure 4:
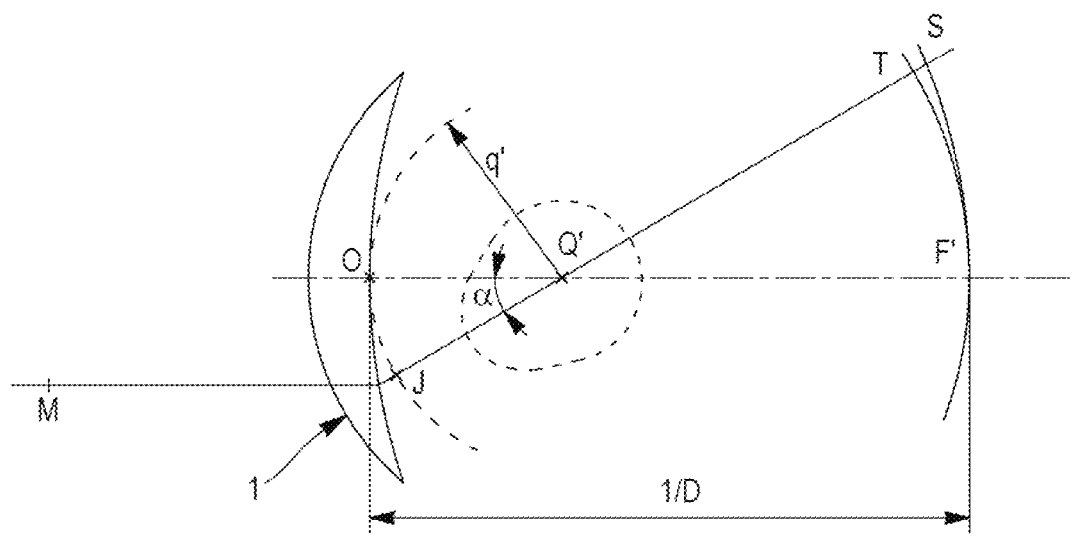

FIGS. 3 and 4 are diagrammatic illustrations of optical systems of eye and lens, thus showing the definitions used in the description. More precisely, FIG. 3 represents a perspective view of such a system illustrating parameters α and β used to define a gaze direction. FIG. 4 is a view in the vertical plane parallel to the antero-posterior axis of the wearer's head and passing through the center of rotation of the eye in the case when the parameter β is equal to 0.

The center of rotation of the eye is labeled Q'. The axis Q'F', shown on FIG. 4 in a dot-dash line, is the horizontal axis passing through the center of rotation of the eye and extending in front of the wearer—that is the axis Q'F' corresponding to the primary gaze view. This axis cuts the aspherical surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface.

An apex sphere, of center Q', and of radius q', is tangential to the rear surface of the lens in a point of the horizontal axis. As examples, a value of radius q' of 25.5 mm corresponds to a usual value and provides satisfying results when wearing the lenses.

A given gaze direction—represented by a solid line on FIG. 3—corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 3. The angle α is the angle formed between the axis Q'J and the projection of the straight line Q'J on the horizontal plane comprising the axis Q'F'; this angle appears on the scheme on FIGS. 3 and 4. A given gaze view thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value toward the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia or wearer's addition.

Using these elements, it is possible to define a wearer optical power and astigmatism, in each gaze direction. An object point M at an object distance given by the ergorama is considered for a gaze direction (α,β). An object proximity ProxO is defined for the point M on the corresponding light ray in the object space as the inverse of the distance MJ between point M and point J of the apex sphere:

ProxO=1/MJ

This enables to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity ProxI is called image proximity of the point M:

$$ProxO = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

$$Pui = ProxO + ProxI$$

With the same notations, an astigmatism Ast is defined for every gaze direction and for a given object proximity as:

$$Ast = \left| \frac{1}{JT} - \frac{1}{JS} \right|$$

This definition corresponds to the astigmatism of a ray beam created by the lens. It can be noticed that the definition gives, in the primary gaze direction, the classical value of astigmatism. The astigmatism angle, usually called axis, is the angle $\gamma$. The angle $\gamma$ is measured in the frame $\{Q', xm, ym, zm\}$ linked to the eye. It corresponds to the angle with which the image S or T is formed depending on the convention used with relation to the direction zm in the plane $\{Q', zm, ym\}$.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng.

Figure 5:
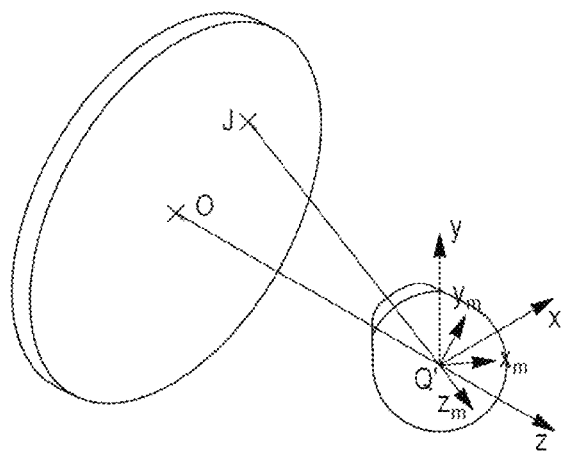
FIG. 5 shows a ray tracing from the center of rotation of the eye.

FIG. 5 represents a perspective view of a configuration wherein the parameters $\alpha$ and $\beta$ are non zero. The effect of rotation of the eye can thus be illustrated by showing a fixed frame $\{x, y, z\}$ and a frame $\{xm, ym, zm\}$ linked to the eye. Frame $\{x, y, z\}$ has its origin at the point Q'. The axis x is the axis Q'O and it is oriented from the lens toward the eye. The y axis is vertical and oriented upwardly. The z axis is such that the frame $\{x, y, z\}$ be orthonormal and direct. The frame $\{xm, ym, zm\}$ is linked to the eye and its center is the point Q'. The xm axis corresponds to the gaze direction JQ'. Thus, for a primary gaze direction, the two frames $\{x, y, z\}$ and $\{xm, ym, zm\}$ are the same. It is known that the properties for a lens may be expressed in several different ways and notably in surface and optically. A surface characterization is thus equivalent to an optical characterization. In the case of a blank, only a surface characterization may be used. It has to be understood that an optical characterization requires that the lens has been machined to the wearer's prescription. In contrast, in the case of an ophthalmic lens, the characterization may be of a surface or optical kind, both characterizations enabling to describe the same object from two different points of view. Whenever the characterization of the lens is of optical kind, it refers to the ergorama-eye-lens system described above. For simplicity, the term 'lens' is used in the description but it has to be understood as the 'ergorama-eye-lens system'.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle $\alpha$ of 0° and an azimuth angle $\beta$ of 0° whatever surface of the lens the fitting cross is positioned—rear surface or front surface.

The above description made with reference to FIGS. 3-5 was given for central vision. In peripheral vision, as the gaze direction is fixed, the center of the pupil is considered instead of center of rotation of the eye and peripheral ray directions are considered instead of gaze directions. When peripheral vision is considered, angle $\alpha$ and angle $\beta$ correspond to ray directions instead of gaze directions.

In the remainder of the description, terms like «up», «bottom», «horizontal», «vertical», «above», «below», or other words indicating relative position may be used. These terms are to be understood in the wearing conditions of the lens. Notably, the "upper" part of the lens corresponds to a negative lowering angle $\alpha<0°$ and the "lower" part of the lens corresponds to a positive lowering angle $\alpha>0°$. Similarly, the "upper" part of the surface of a lens—or of a semi-finished lens blank—corresponds to a positive value along the y axis, and preferably to a value along the y axis superior to the y_value at the fitting cross and the "lower" part of the surface of a lens—or of a semi-finished lens blank—corresponds to a negative value along the y axis in the frame, and preferably to a value along the y axis inferior to the y_value at the fitting cross.

The lens comprises a far vision zone located in the upper part of the lens, a near vision zone located in the lower part of the lens and an intermediate zone situated in the lower part of the lens between the far vision zone and the near vision zone. The lens also has a main meridian passing through the three zones and defining a nasal side and a temporal side.

For the purpose of the invention, the meridian line of a progressive lens is defined as follow: for each lowering of the view of an angle $\alpha = \alpha 1$ between the gaze direction corresponding to the fitting cross and a gaze direction being in the near vision zone, the gaze direction ($\alpha 1$, $\beta 1$) is searched for which the local residual astigmatism is minimum. Thus, all the gaze directions defined in that way form the meridian line of the ergorama-eye-lens system. The meridian line of the lens represents the locus of mean gaze directions of a wearer when he is looking from far to near visions. The meridian line of a surface of the lens is defined as follows: each gaze direction ($\alpha$, $\beta$) belonging to the optical meridian line of the lens intersects the surface at a point (x, y). The meridian line of the surface is the set of points corresponding to the gaze directions of the meridian line of the lens.

The meridian separates the lens into a nasal area and a temporal area. As expected, the nasal area is the area of the lens which is between the meridian and the nose of the wearer whereas the temporal area is the area which is between the meridian and the temple of the wearer. The nasal area is labeled Area_nasal and the temporal area is labeled Area_temporal, as it will in the remainder of the description.

The invention may apply to the distortion. Distortion is a defect which is not related to the resolution of images impacting the sharpness or the contrast of the image formed by the periphery of the visual field of the lens but merely to their shape. In ophthalmic optics, "barrel" distortion occurs with minus lenses whereas "pin-cushion" distortion occurs with plus lenses; these are inherent in the optical characteristics of simple plus or minus lenses. Distortion can be evaluated in different situations of use of the lens.

Figure 6:
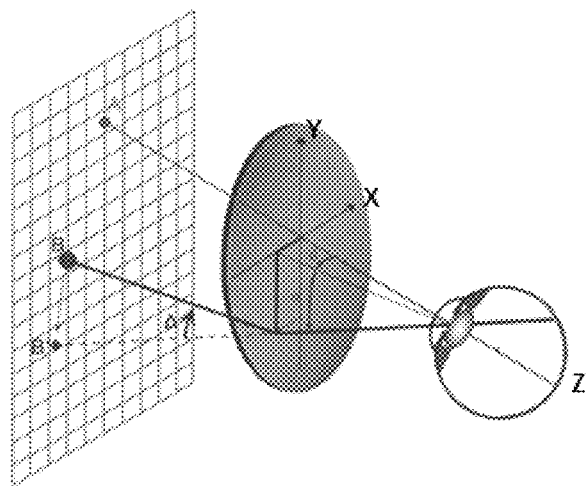
FIGS. 6, 7 and 8 show the effect of distortion in static vision and ways to quantify this phenomenon.
Figure 7:
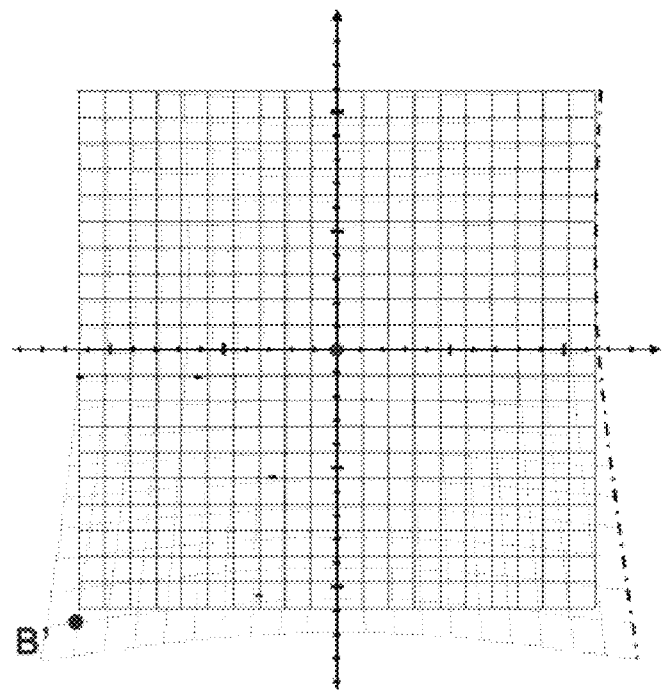

First, a fixation point is imposed to the wearer so that he keeps his eye immobile (thus the gaze direction is fixed). In this case, the distortion which is evaluated is called "static distortion" and it is evaluated in peripheral vision (named also indirect vision). FIG. 6 illustrates the effect of distortion along a ray seen by a viewer in his peripheral field of vision after passing through a lens. Thus, while the wearer is looking at a point A in central vision, some peripheral points such as point B are also seen. Due to prismatic deviation, the wearer has the feeling that the object point is at B' and not at point B. The angle A is a quantitative way of expressing the prismatic deviation which gives to the wearer the illusion that point B is located at point B'. Several quantities can be calculated to evaluate distortion. For instance, we can quantify how a vertical and/or a horizontal line of an object grid seen in the peripheral vision as being curved, as shown in FIG. 7. In this figure, the grid (solid lines) seen without the lens and which is not deformed is superimposed with the distorted grid (broken lines) seen through the lens. Therefore, it becomes apparent that the distortion has an impact on peripheral vision. Moreover, it also appears that the distortion can be quantified by calculating how a peripheral square is deformed.

Figure 8:
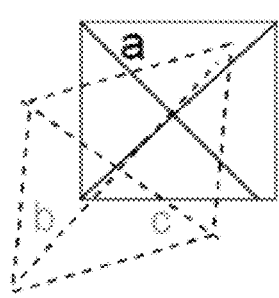

For this calculation, FIG. 8 is an enlarged view of one square of the grid seen without the lens over which is superimposed the deformed square of the deformed grid seen through the lens. The square has two diagonals whose lengths are labeled a. Thus, the division of the length of each diagonal is a/a=1 in the case of the square of the grid seen without the lens. The corresponding deformed square has two diagonals whose lengths are different and are respectively labeled b and c, b corresponding to a diagonal longer than c. For this deformed square b/c is different from 1. The more this ratio is greater than 1, the greater is the distortion in this area of the lens. Calculating the ratio of the diagonal is thus a way of quantifying distortion. Distortion can also be evaluated considering that the eye is moving behind the lens and this kind of distortion is named dynamic distortion. It appears in the periphery of the central visual field and it is evaluated in central vision (named also direct vision).

Thus distortion can be evaluated in static vision, i.e. the direction of gaze is fixed and distortion is analyzed in peripheral vision. Distortion can also be evaluated in dynamic vision, i.e. the direction of gaze is free and distortion is analyzed in central vision. Evaluation in static or dynamic vision is made depending on the intended use of the lens. Reference can be made to publication «La distortion en optique de lunetterie» by Yves LE GRAND Annales d'Optique Oculaire 5ème armee N° 1 Janvier 1956.

The invention relates to a method, for example implemented by computer means, for modifying a non-dioptric parameter of an optical system comprising a first and a second surface. The method comprises a modifying step during which the first surface and second surface of the optical system are modified so as to obtain a modified optical system such that the dioptric function of the modified optical system is substantially the same as the dioptric function of the optical system.

The optical system is a see-trough optical system having an dioptric function.

An optical system is defined by the coefficients of the equations of all its surfaces, the refractive index of the material and the position of each surface relatively to each other (offset, rotation and tilt). These elements are referred as the parameters of the optical system. Surfaces of an optical system are usually represented according to a polynomial or parametric equation obtained by using a model based on the B-splines or Zernike polynomials. These models give continuous curvature on the whole lens. Surfaces can also be Fresnel or pixelized surfaces. The refractive index of materials can be inhomogeneous and depend on some parameters of the optical system.

For example, the optical system may comprise optical lenses, such as ophthalmic lenses, single or multi focal lenses, progressive addition lenses.

According to an embodiment of the invention, the optical system is a semi-finished lens blank having a finished surface and a non-finished surface.

The optical system may be an see-trough electro-optical system with a switchable function (active function) that enables at least part of the active function of the system to be controlled by an electrical stimulus. The see-trough electro-optical system may be a see-trough display system arranged to display information over the real world view. For example, the see-trough display system is arranged to display compute generated information over the real world view, thus allowing realizing augmented reality device.

Figure 9:
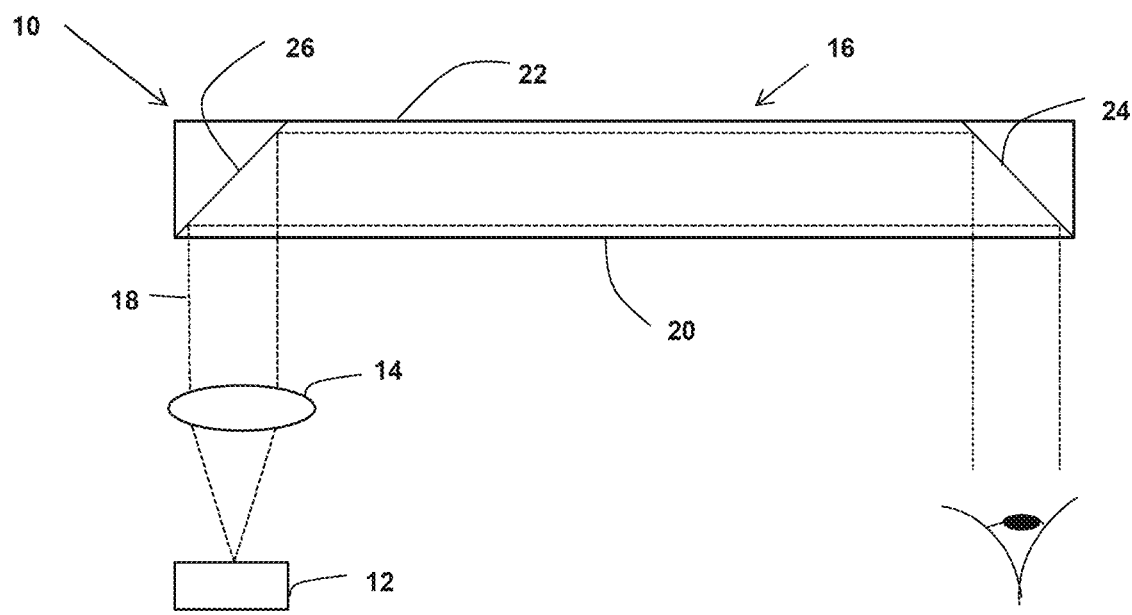
FIG. 9 is a schematic view of a see-trough electro-optical system.

An example of see-trough display system is illustrated in FIG. 9. Such see-trough display system 10 comprises a display source 12, a collimating device 14, and an optical insert 16 constituted by a light-guide optical element 16.

Such see-trough display system 10 allows a two-dimensional image source to be imaged to infinity or not and reflected into the eye of the wearer.

The display source 12 can be emissive or not emissive.

It can be directly obtained from either a spatial light modulator (SLM) such as a cathode ray tube (CRT), a liquid crystal display (LCD), an organic light emitting diode array (OLED), a scanning source, liquid crystal on silicon (LCoS) or similar devices, or indirectly, by means of a relay lens or an optical fiber bundle. The display source 12 comprises an array of elements (pixels) imaged to infinity by the collimating device 14, for example a collimating lens.

The light-guide optical element 16 typically includes at least two major surfaces 20 and 22 and edges, at least one partially reflecting surface 24 and an optical element 26 for coupling light thereinto. The output waves 18 from the collimating device 14 enter the light-guide optical element 16 through its lower surface 20. The incoming waves (towards the light-guide optical element) are reflected from the surface 26 and trapped in the light-guide optical element 16.

The collimating device 14 can easily be integrated into a single mechanical module which may be assembled independently of the light-guide optical element 16, with fairly relaxed mechanical tolerances.

In this embodiment, the method comprises a display mounting step S0 during which the display source 12 and the collimating device 14 are coupled to the optical insert 16.

The non-dioptric parameter that may be modified in the method according to the invention may be selected in a list consisting of the overall optical distortion of the optical system, local optical distortion of the optical system, the thickness of the optical system, and the geometry of at least one of the surfaces of the optical system.

Figure 10:
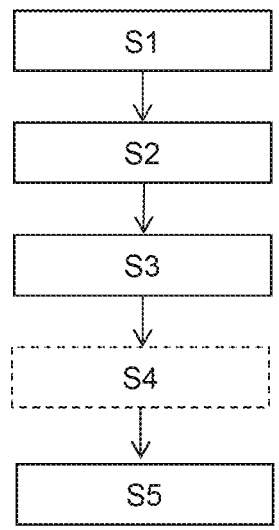
FIGS. 10 and 11 are illustrations of a chart-flows of methods according to different embodiments of the invention.

As illustrated on FIG. 10, the method of the invention may comprise:
an optical system data providing step S1,
a modifying surface providing step S2,
a complementary modifying surface determining step S3, and
an adding step S5.

During the optical system data providing step S1 data indicative of the optical system are provided. The data comprise at least data indicative of the first and second surface and a data indicative of the relative position of the first and second surfaces.

Typically, the data comprise at least data indicative of the first and second surfaces of the initial optical system associated with a first coordinate system and a data indicative of the relative position of the first and second surfaces. The initial surfaces Sf,ini and Sr,ini comprising a plurality of surface points Pf,i and Pr,i, each surface point Pf,i and Pr,i having a mean sphere Sph(Pf,i), Sph(Pr,i) and a cylinder Cyl(Pf,i), Cyl(Pr,i), said initial optical lens having an initial dioptric function.

At least one modifying surface (Smod) is provided during the modifying surface providing step S2. Typically, the modifying surface $Smod_1$ is associated with a second coordinate system, and comprises a plurality of surface points $P_1, \ldots P_m$, each surface point $P_i$ having a mean sphere $Sph(P_i)$ and a cylinder $Cyl(P_i)$.

The modifying surface may for example be selected in a list of existing modifying surfaces that have been optimized to modifying a specific non-dioptric parameter of the optical system.

During the complementary modifying surface determining step S3, for each at least one modifying surface (Smod) a complementary modifying surface (Sconmod) substantially identical to the at least one modifying surface (Smod) is determined.

According to an embodiment of the invention, the complementary modifying surface is the same as the modifying surface.

Each complementary modifying surface $Sconmod_1$ is typically associated with the second coordinate system, and comprises a plurality of surface points $Pcon_1, \ldots Pcon_m$, each surface point $Pcon_i$ having a mean sphere $Sph(Pcon_i)$ and a cylinder $Cyl(Pcon_i)$. The complementary modifying surface is considered as substantially identical to the modifying surface when for each surface point $Pcon_i$ of the complementary modifying surface the mean sphere $Sph(Pcon_i)$ is substantially equal in absolute value to and of opposed sign than the mean sphere $Sph(P_i)$ of the corresponding points of the modifying surface and the mean cylinder $Cyl(Pcon_i)$ is substantially equal to the mean cylinder $Cyl(P_i)$ of the corresponding points of the modifying surface.

During the adding step, the at least one modifying surface (Smod) is added to one of the surfaces of the optical system and the complementary modifying surface (Sconmod) is added to the other of the surfaces so as to obtain a modified optical system having substantially the same dioptric function as the initial optical system.

Typically, during the complementary modifying surface determining step, the complementary modifying surface (Sconmod) is determined so that the modified optical system has the same dioptric function than the optical system.

In the sense of the invention, the modified optical system is considered to have substantially the same dioptric function as the initial optical system if the difference in optical power and astigmatism between both system is all gazing direction in the same wearing conditions is smaller than or equal to 20%, for example smaller than or equal to 0.12 D.

The wearing conditions are to be understood as the position of the optical system with relation to the eye of a wearer, for example defined by a pantoscopic angle, a Cornea to lens distance, a Pupil-cornea distance, a ERC to pupil distance, a ERC to lens distance and a wrap angle.

The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm.

The ERC to pupil distance is the distance along the visual axis of the eye between its center of rotation (ERC) and cornea; for example equal to 11.5 mm.

The ERC to lens distance is the distance along the visual axis of the eye in the primary position (usually taken to be the horizontal) between the ERC of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to −8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearer condition may be defined by a pantoscopic angle of −8°, a Cornea to lens distance of 12 mm, a Pupil-cornea distance of 2 mm, a ERC to pupil distance of 11.5 mm, a ERC to lens distance of 25.5 mm and a wrap angle of 0°.

Other conditions may be used. Wearing conditions may be calculated from a ray-tracing program, for a given lens.

As represented on FIG. 10, the method according to the invention may comprise prior to the adding step an orientation step S4, during which the relative position and orientation of the first coordinate system and the second coordinate system is determined.

For example the first coordinate system may be defined as having it origin at the fitting cross of the initial optical lens, the x axis being perpendicular to the surface of the front surface of the initial optical lens at the fitting cross and the y and z axis being defined so as to have an orthonormal system. The second coordinate system is an orthonormal system centered at the point of the modifying surface to be matched with the fitting cross of the optical lens with the x-axis of the second coordinate system match the x-axis of the first coordinate system.

Furthermore, the method according to the invention may comprise an optimizing step during which at least one of the modifying surface (Smod) and/or the complementary modifying surface (Sconmod) is optimized so as the modified optical system has the same dioptric function than the optical system.

Figure 11:
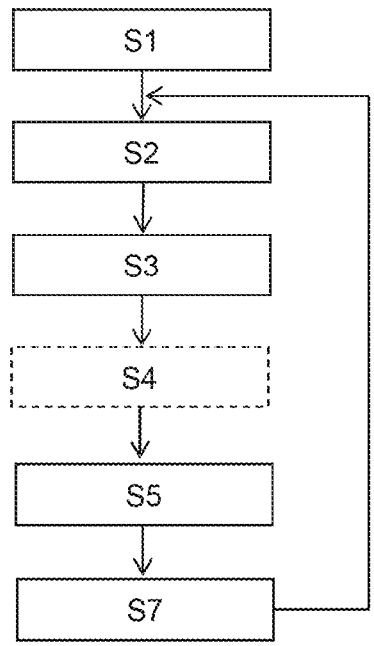

According to an embodiment illustrated on FIG. 11, the method according to the invention may further comprise after the adding step S5, a modifying evaluation step S7.

During the modifying evaluation step S7 the at least one non-dioptric modified parameter of the optical system is compared to a target value which is a chosen criterion and a chosen value for this criterion (e.g. "end-to end" criteria 20% lower than the value of the initial design, or a minimum or maximum thickness of the lens at a particular point).

As illustrated on FIG. 11, the modifying surface providing step S2, the complementary modifying surface determining step S3, the orientation step S4 and the adding step S5 are repeated to have the value of the non-dioptric parameter of the modified optical system as close as possible to the target value.

According an embodiment of the invention, the optical system is a semi-finished lens blank having a finished surface and a non-finished surface, the non-dioptric parameter being the geometry of the finished surface imposed to the first surface. In such embodiment, the modifying surface is the difference between the finished surface of the semi-finished lens blank and the initial surface of the optical lens.

An example of implementation of the invention is described hereafter with reference to FIGS. 12 to 17.

In this example, the goal is to reduce the optical distortion of an initial progressive addition lens by adding a modifying surface and a complementary modifying surface to the front and rear surfaces of the ophthalmic lens.

The initial ophthalmic lens is an IPSEO3™ corresponding to a far vision of −4 D with an addition of 2.5 D made in a material having an refractive index of 1.665. The front surface of the ophthalmic lens is spherical with a commercial base of 2.75 (using refractive index equal to 1.53).

Figure 12A:
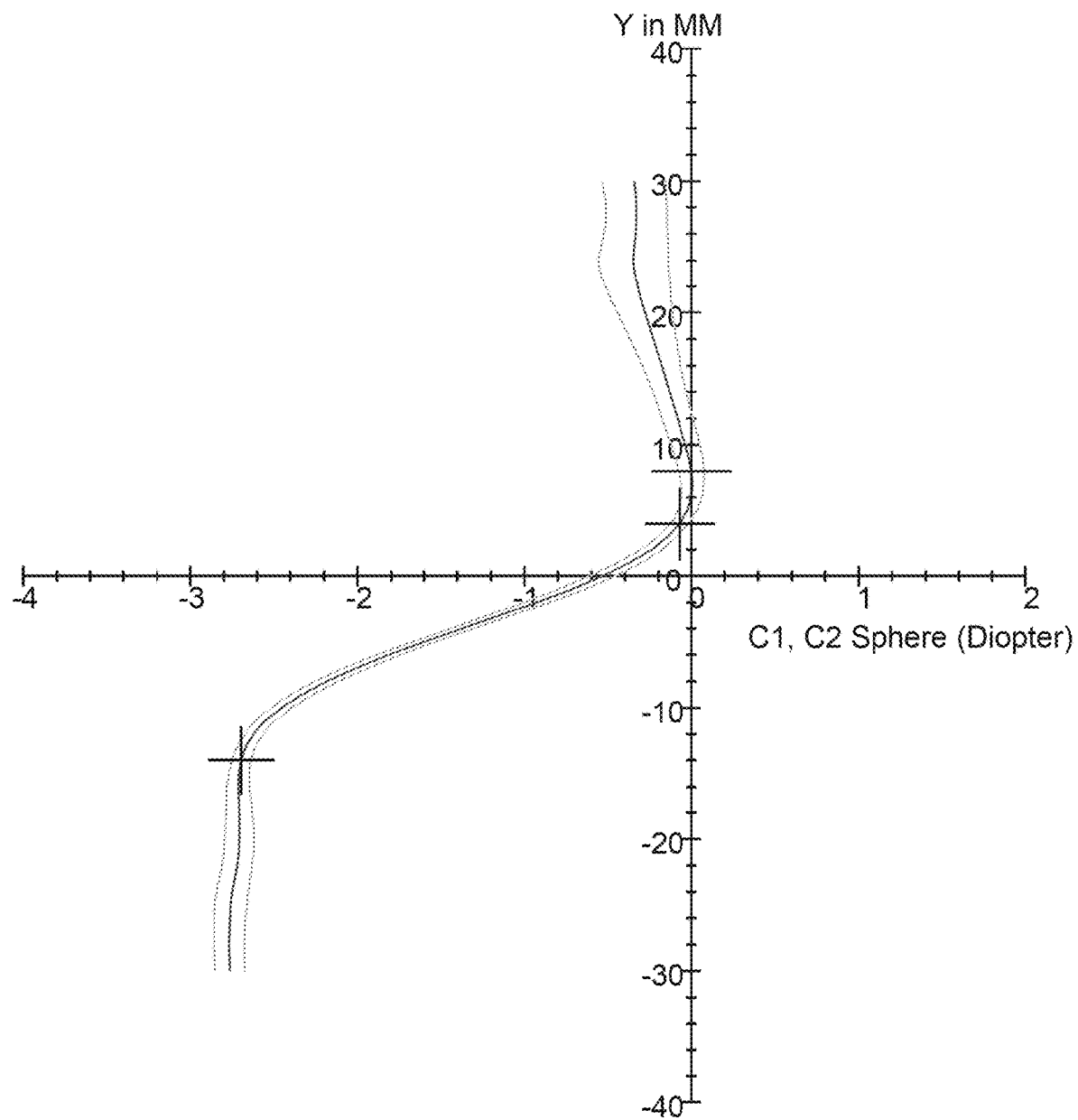
FIGS. 12 to 17 illustrate an example of implementation of the method according to the invention.
Figure 12B:
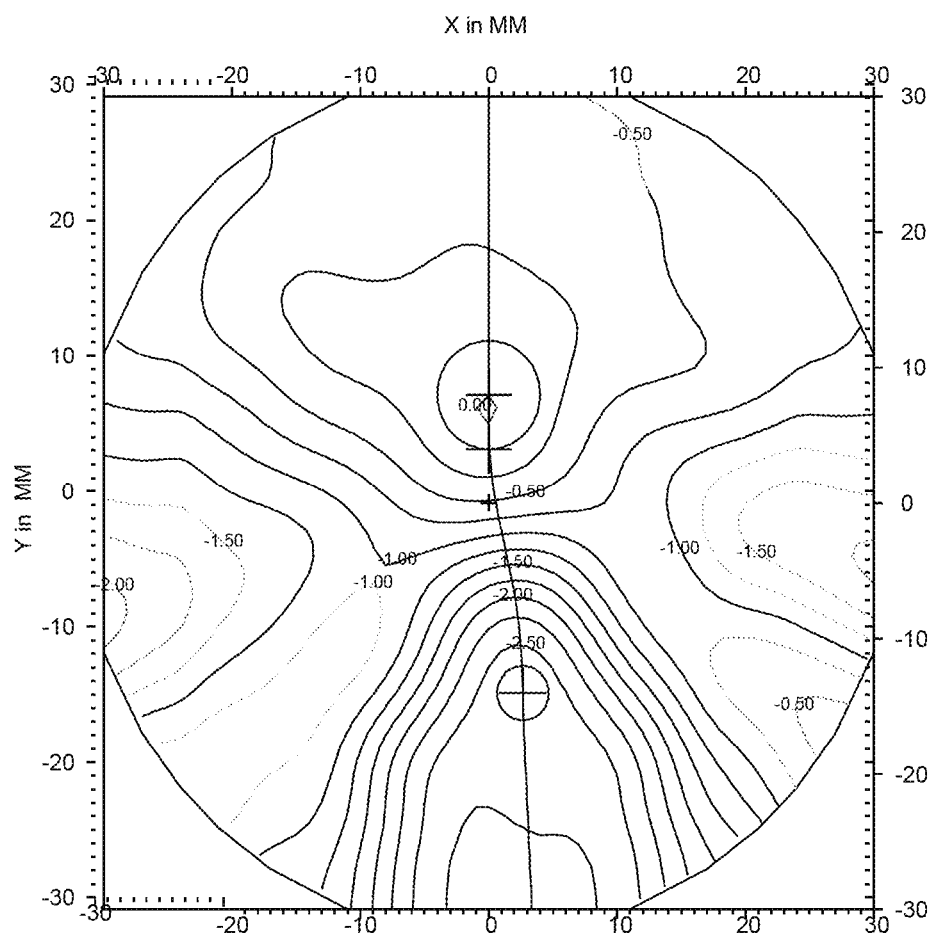
Figure 12C:
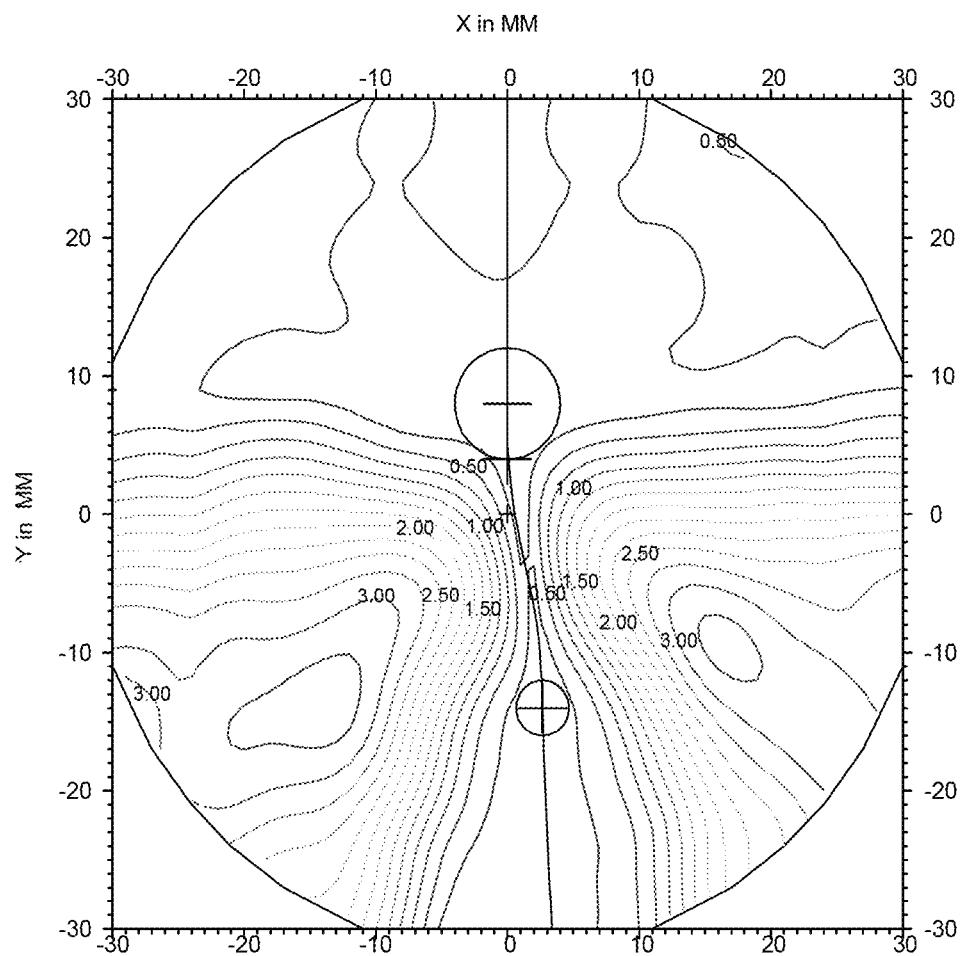

FIGS. 12a to 12c show the surface features of the rear surface of the initial progressive ophthalmic lens.

FIG. 12a shows absolute values of mean sphere deviation curve surrounded by minimum and maximum sphere deviation curves, along the meridian. Said sphere deviation expresses the difference between absolute of the sphere value and absolute value of the sphere at the far vision point. The x-axes are graduated in diopters, and the y-axes give the height, in mm, on the lens along the meridian line. The Sphere value at the far vision point equals 7.36 diopters. The (0,0) point corresponds to the prism reference point.

Figure 13A:
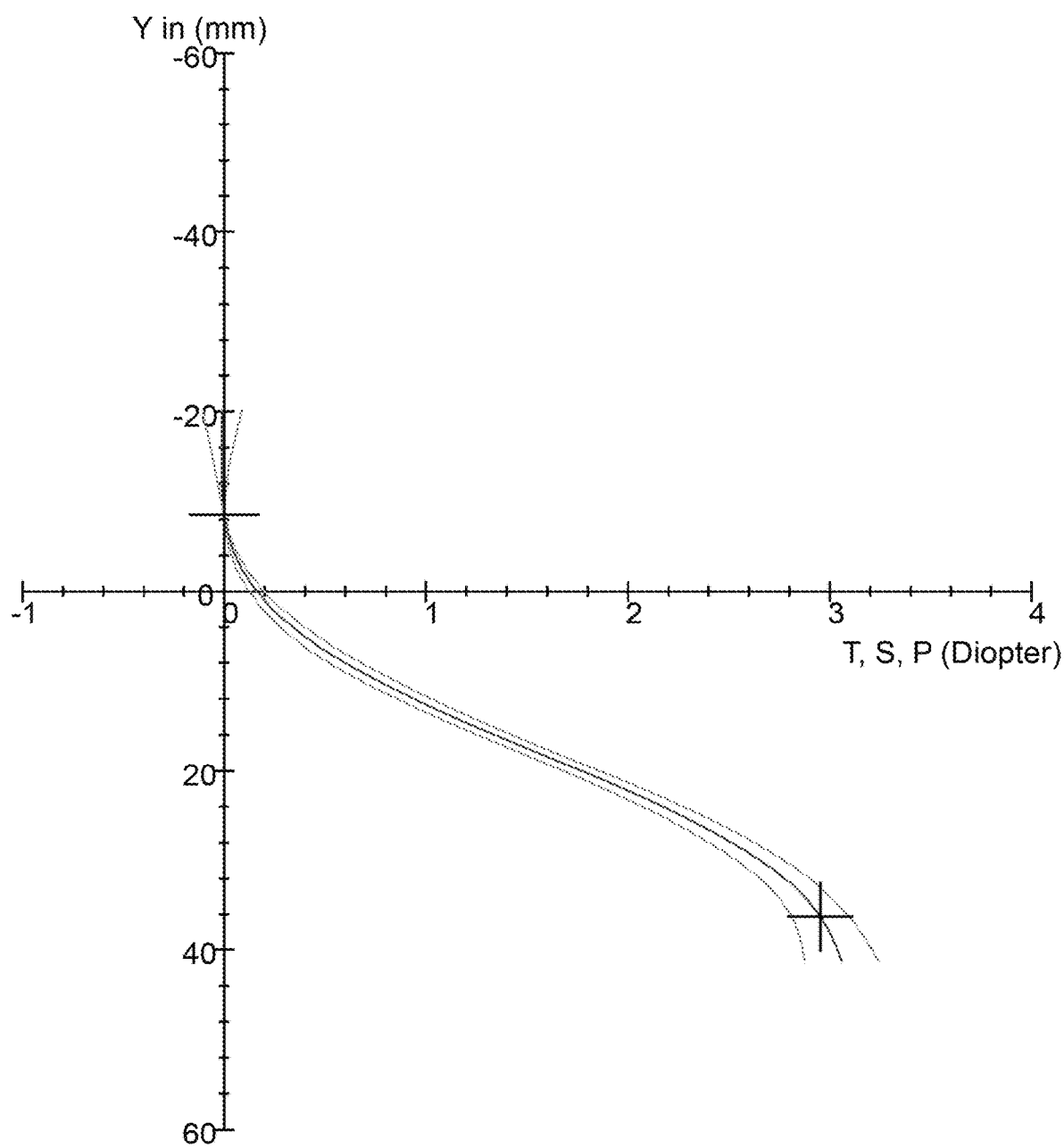
Figure 13B:
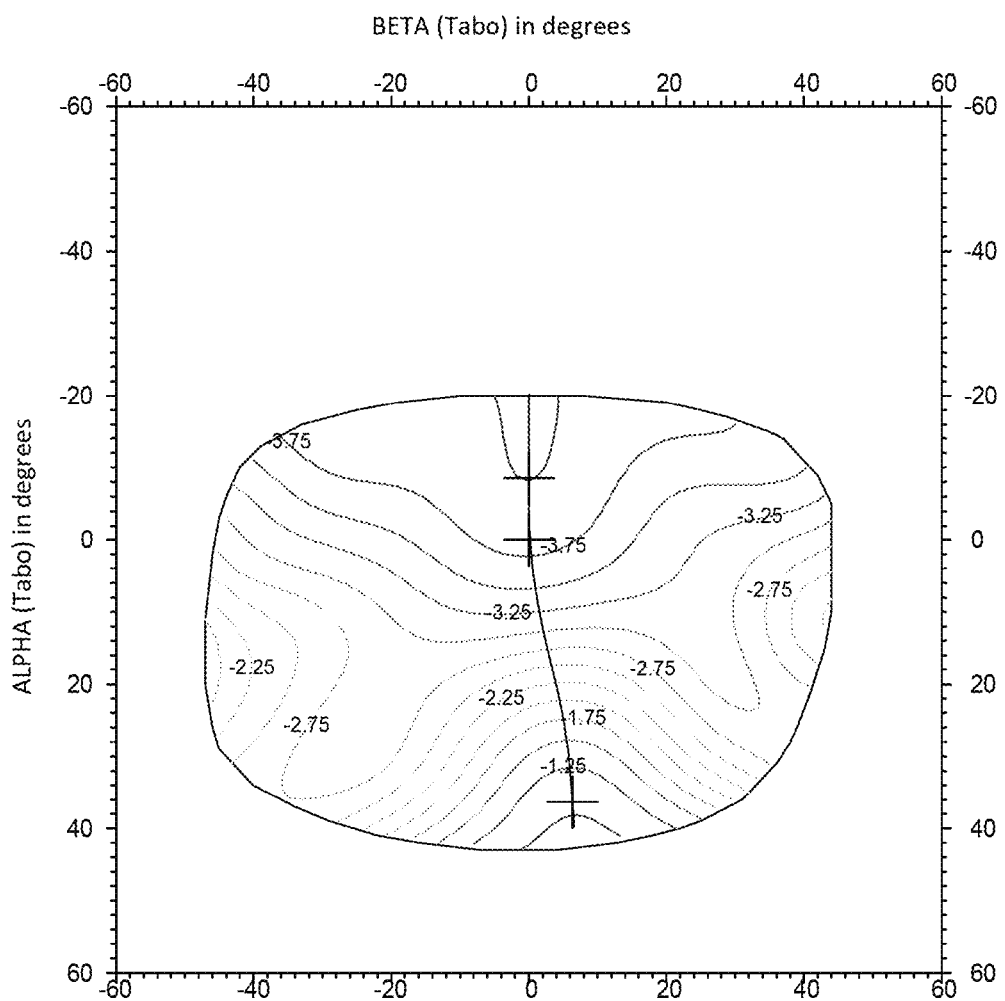
Figure 13C:
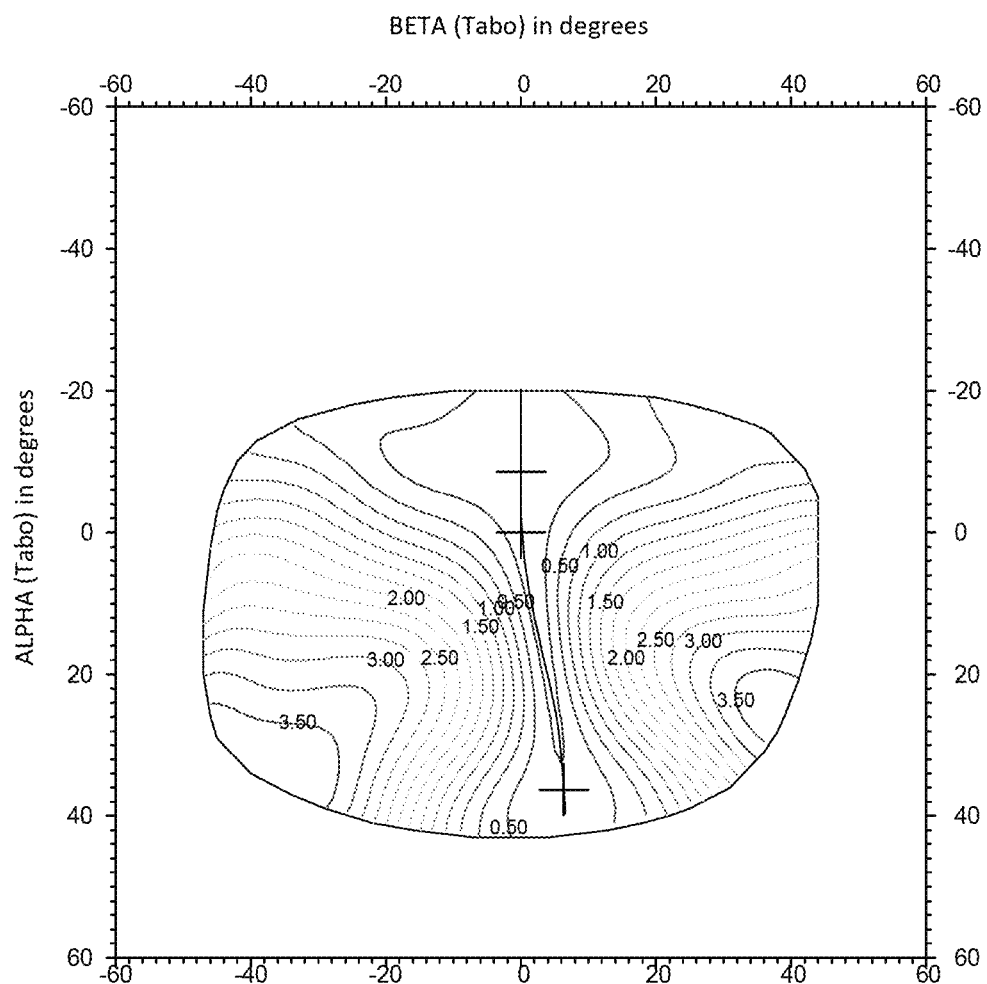

FIGS. 13a to 13c show the optical features of the initial progressive ophthalmic lens in previously defined standard wearing conditions.

FIG. 13a shows refractive power deviation surrounded by minimum and maximum refractive power deviation, along the meridian. Said power deviation expresses the difference between the real power value and the power at the far vision point (−4 Diopters). The x-axes are graduated in diopters, and the y-axes give the gaze direction inclination, in degrees.

FIG. 13b shows lines of equal power, i.e. lines formed by points for which power has an identical value. The x-axis and y-axis respectively give the angles [α] and [β].

FIG. 13c shows, using the same axes as FIG. 13b, lines of equal astigmatism.

For FIGS. 13a-13c, the (0,0) point corresponds to the gaze direction of the fitting cross about 4 mm from the prism reference point.

The non-dioptric parameter to be modified relates to optical distortion. In this example, the optical distortion is expressed as an "end to end" criteria corresponding to the deformation of the vertical lines in central vision of a vertical grid of 2 m over 2 m placed at 1 m facing the wearer.

The "end to end" of a vertical line of the grid is the difference along the horizontal axis x between the highest point and the lowest point of this line seen through the lens. The "end to end" criteria may be normalize by the addition of optical lens so as to not take into account the improvement if the distortion due only to addition of optical reduction. An "end to end" close to 0 is a balance between the distortion of the vertical lines at the top and bottom of the lens that is to a unifocal lens.

Figure 19A:
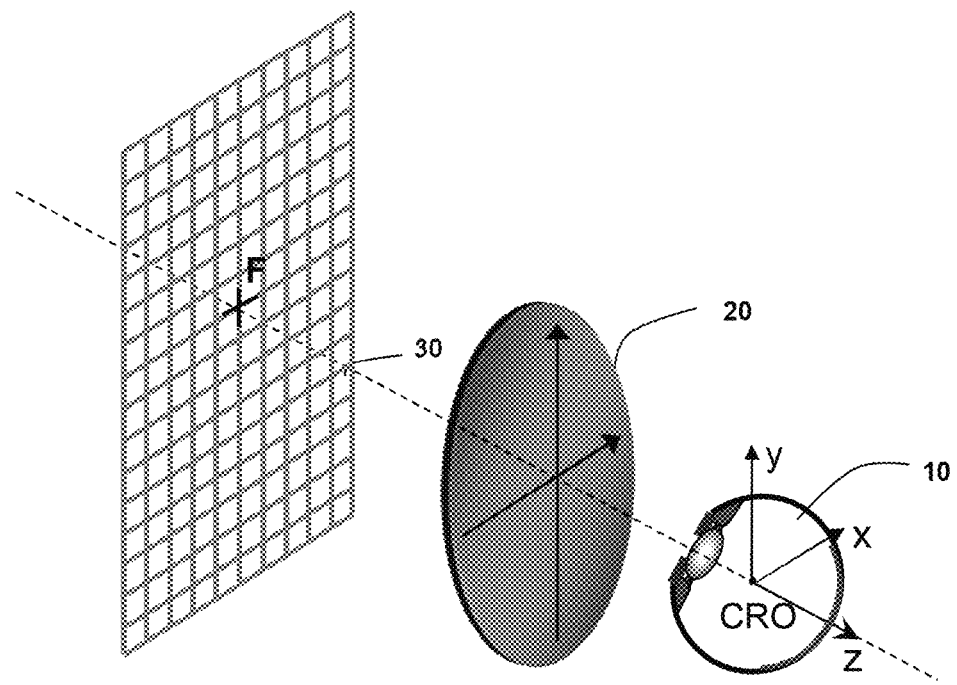
FIG. 19*a* is a schematic representation of a system comprising an eye of a wearer, an ophthalmic lens and an object vertical plane
Figure 19B:
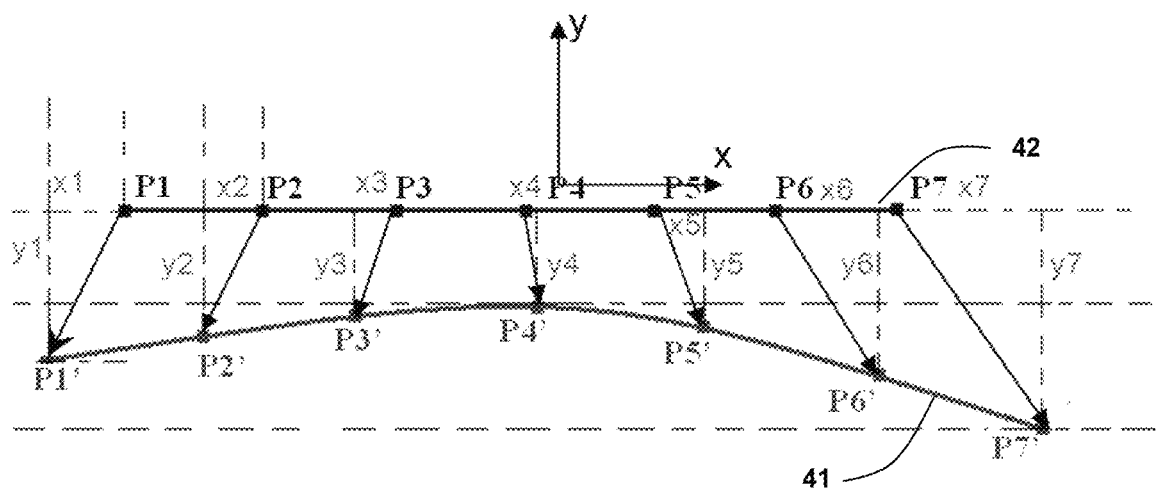
FIG. 19*b* is a schematic representation of the deformation of a line through an ophthalmic lens.

As illustrated on FIGS. 19a and 19b, for determining the optical distortion the inventors have considered specific wearing condition defined by a pantoscopic angle of −8°, a Cornea to lens distance of 12 mm, a Pupil-cornea distance of 2 mm, a ERC to pupil distance of 11.5 mm, a ERC to lens distance of 25.5 mm and a wrap angle of 0°.

The ophthalmic lens is considered as having a rectangular shape corresponding approximately to the shape of a frame of 54 mm of length and 38 mm of height, with a bridge distance of 16 mm for a mounting height of 22 mm and a half pupil distance of 32.5 mm.

A vertical object plane is considered at 1 meter from the front surface of the ophthalmic lens.

A fixation point F in the vertical object plane is defined as being the intersection of the visual axis of the eye in the primary position (z) with the vertical object plan.

In the vertical object plane a horizontal line 30 is built (parallel to the x axis) seen through the bottom of the ophthalmic lens. For this, one considers the vertical power at the near vision point given by the prescription power at the far vision point and the prescribed addition, and the horizontal line is positioned along the y axis with the approximation of Prentice:

$$D=P*d/10$$

Where D is the prismatic deviation in prism diopters, P is the power of the lens in diopters, d is the distance to the center of the lens in mm. In the present case d is set equal to 22 mm.

Once the horizontal line positioned in the vertical object plane, said horizontal line is sampled in a number of points regularly spaced. The image of the horizontal line 30 through the ophthalmic lens 20 is calculated using the image of each of the sampled points through the lens obtained by ray tracing and projected in the vertical object plane.

A curve image line 41 of the object line 42 is then obtained as shown on FIG. 19b.

Figure 14A:
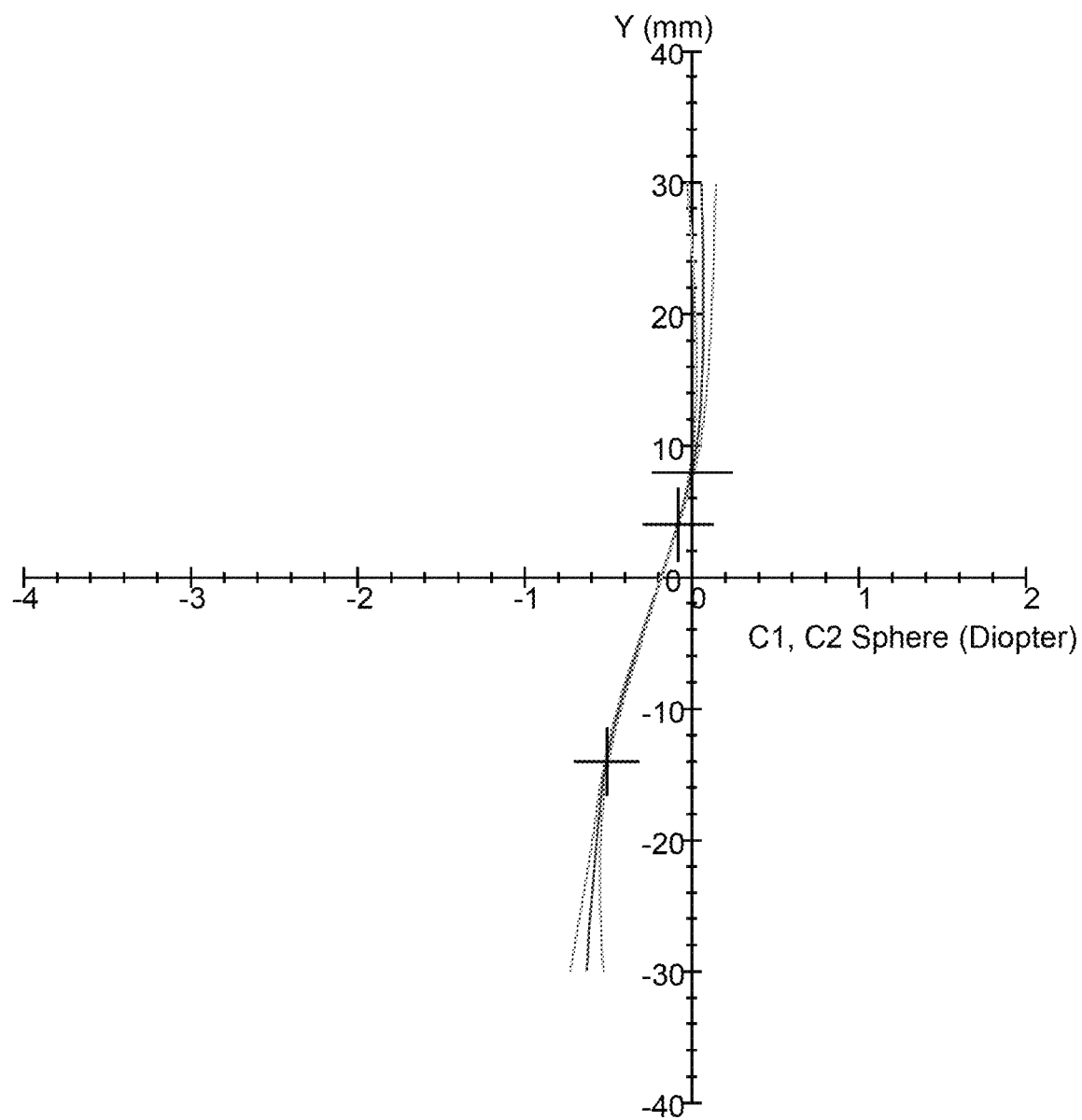
Figure 14B:
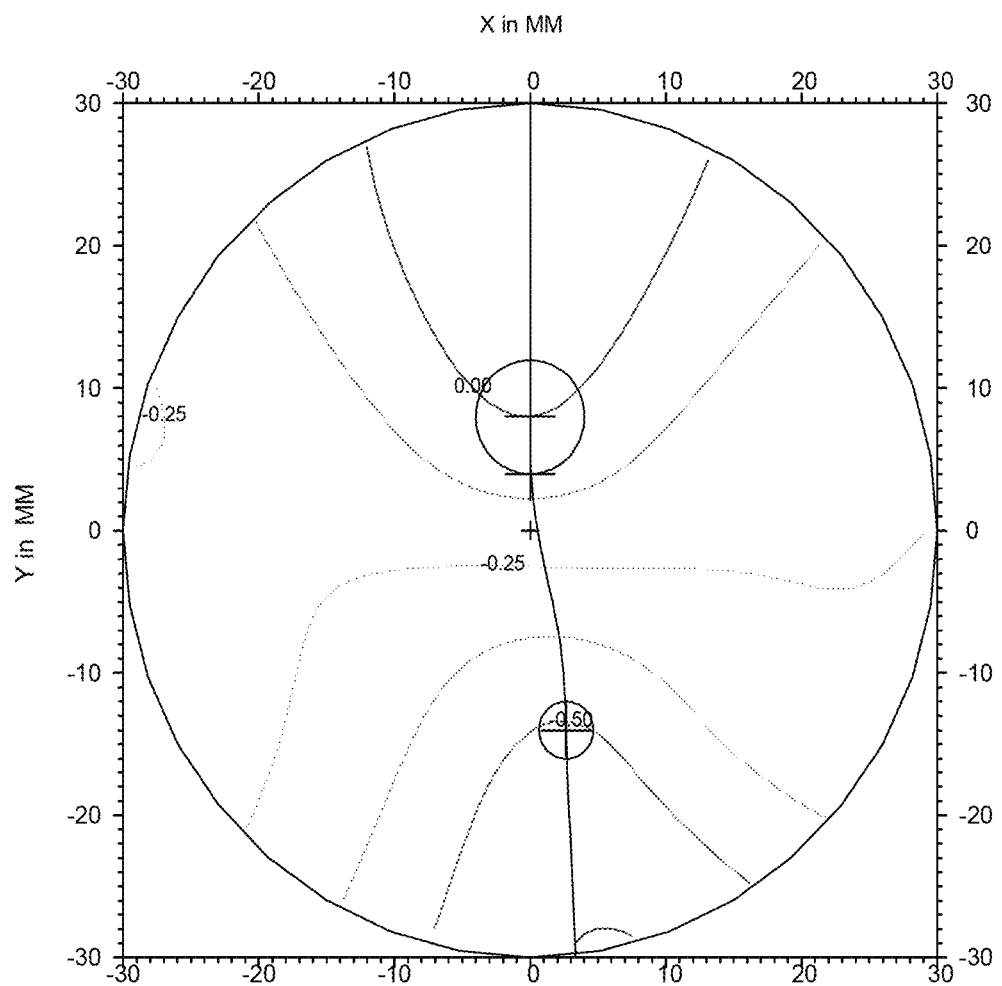
Figure 14C:
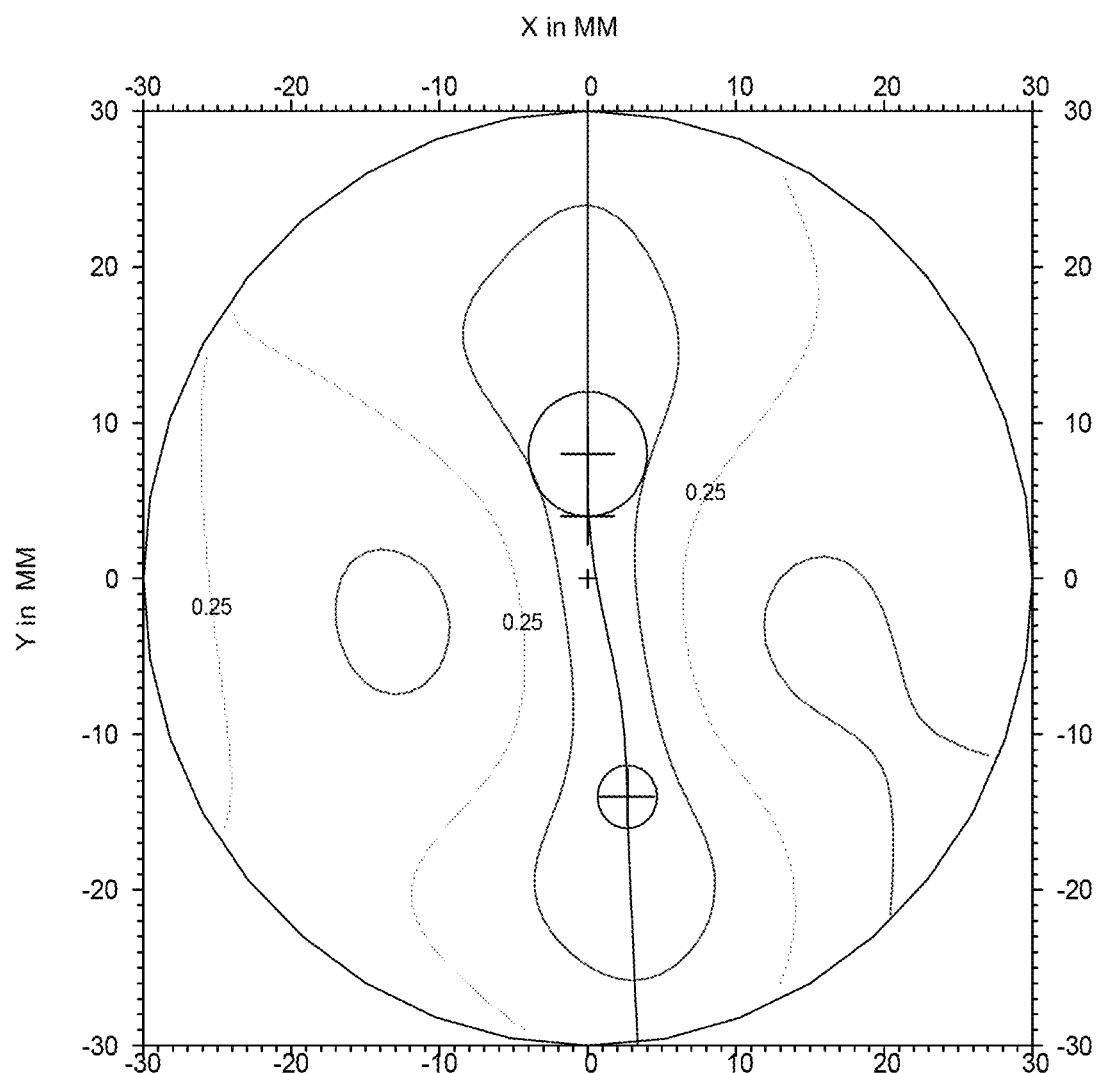

Finally, deformation of a horizontal line can be calculated as being the average (y1, y2, . . . yn) which represents the average movement of the horizontal line 30 through the ophthalmic lens 20. The deformation of the horizontal line is representative of the deformation of objects seen through the ophthalmic lens. FIGS. 14a to 14c show the surface features of a modifying surface to be added to the front and rear surfaces of the IPSEO3™ lens so as to reduce distortion.

FIG. 14a shows absolute values of mean sphere deviation curve surrounded by minimum and maximum sphere curves, along the meridian. Said sphere deviation expresses the difference between absolute value of the sphere and absolute value of the sphere at the far vision point.

The x-axes are graduated in diopters, and the y-axes give the height, in mm, on the lens along the meridian line. The Sphere value at the far vision point equals 0 diopter. The (0,0) point corresponds to the prism reference point.

FIG. 14b shows lines of equal mean sphere, i.e. lines formed by points for which the mean sphere has an identical value. The x-axis and y-axis give the height, in mm respectively along the horizontal and vertical directions.

FIG. 14c shows, using the same axes as for FIG. 14b, lines of equal cylinder.

Figure 15A:
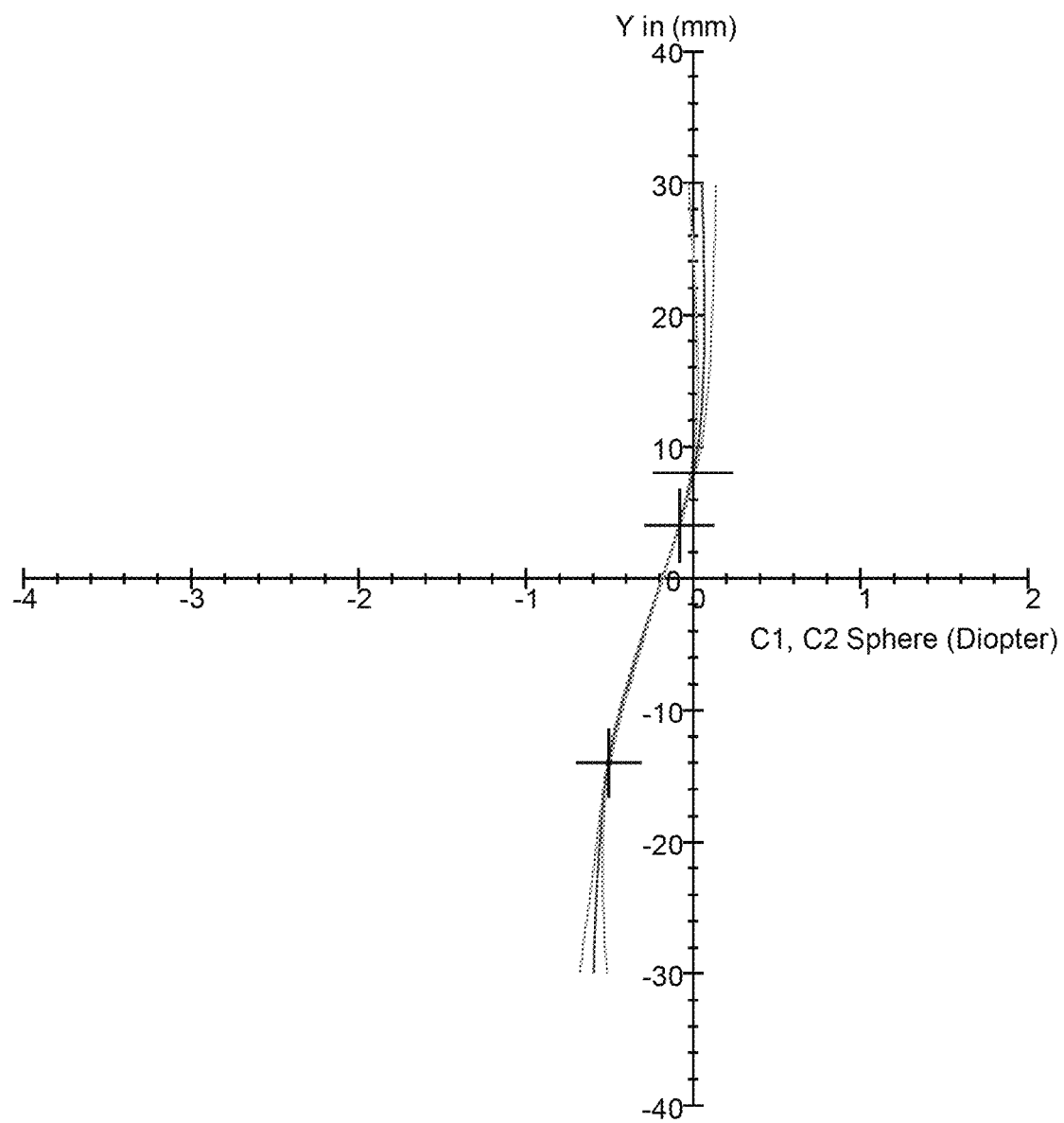
Figure 15B:
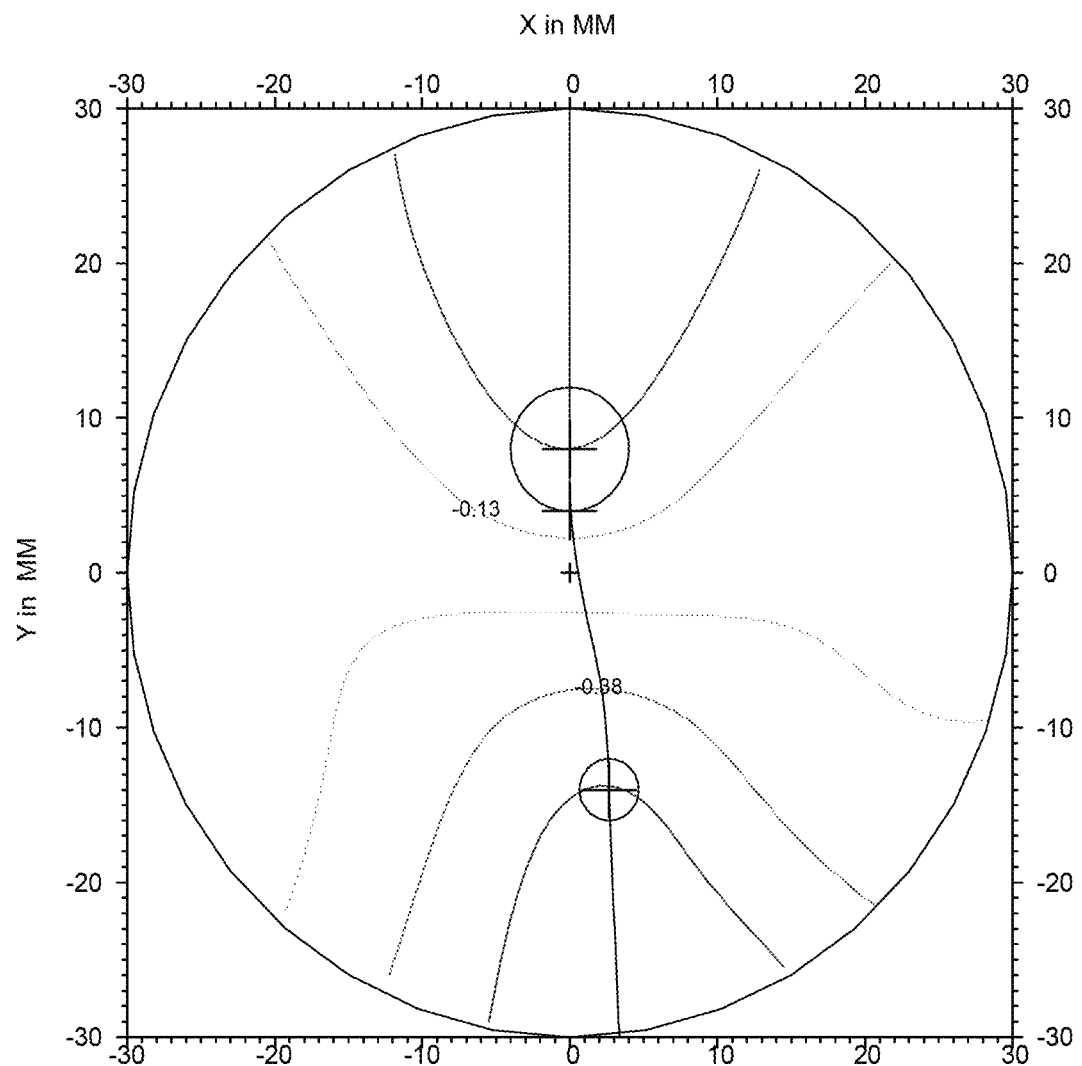
Figure 15C:
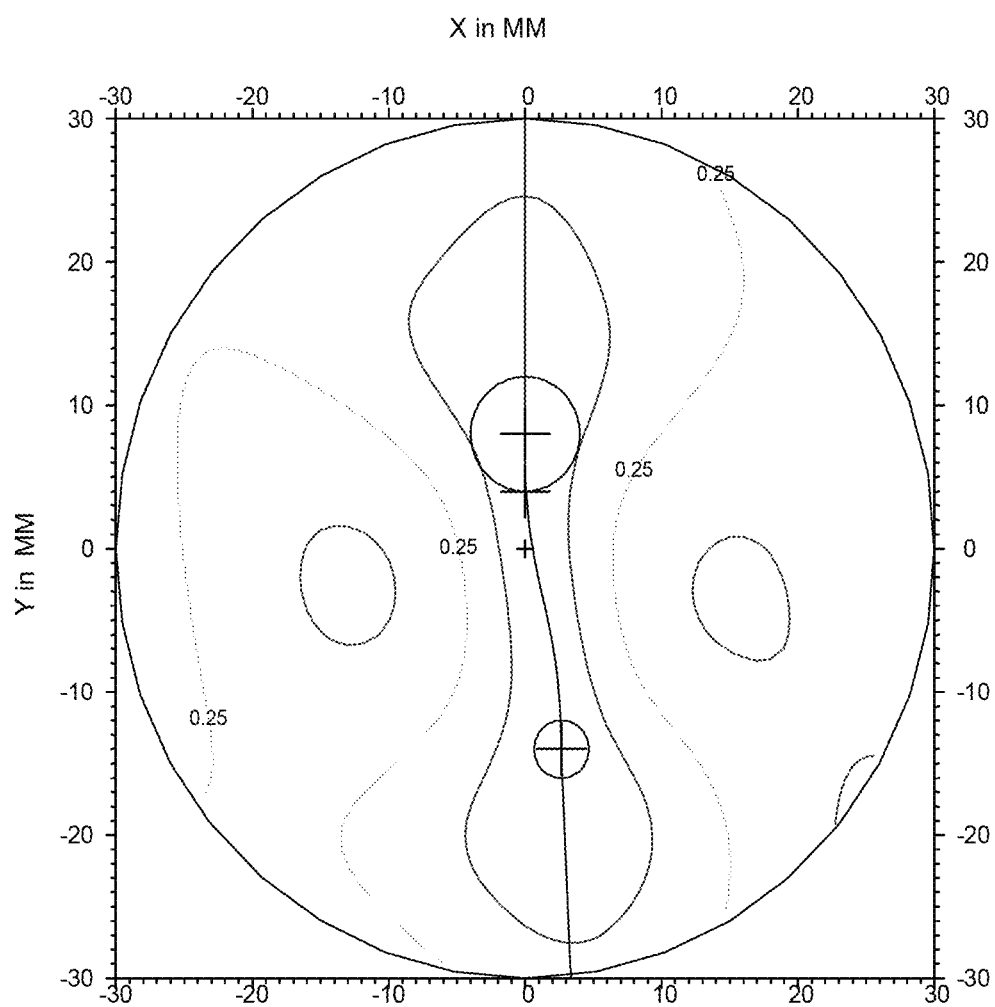

FIGS. 15a to 15c show the front surface of the modified IPSEO3™ corresponding to the front surface of the IPSEO3™ lens combined with the modifying surface illustrated on FIGS. 14a to 14c.

FIG. 15a shows absolute values of mean sphere deviation curve surrounded by minimum and maximum sphere curves, along the meridian. Said sphere deviation expresses the difference between absolute value of the sphere and absolute value of the sphere at the far vision point.

The x-axes are graduated in diopters, and the y-axes give the height, in mm, on the lens along the meridian line. The Sphere value at the far vision point equals 7.36 diopters for the rear surface and 3.45 diopters for the front surface. The optical lens being in a material having an refractive index of 1.665. The (0,0) point corresponds to the prism reference point.

FIG. 15b shows lines of equal mean sphere, i.e. lines formed by points for which the mean sphere has an identical value. The x-axis and y-axis give the height, in mm respectively along the horizontal and vertical directions.

FIG. 15c shows, using the same axes as for FIG. 15b, lines of equal cylinder.

Figure 16A:
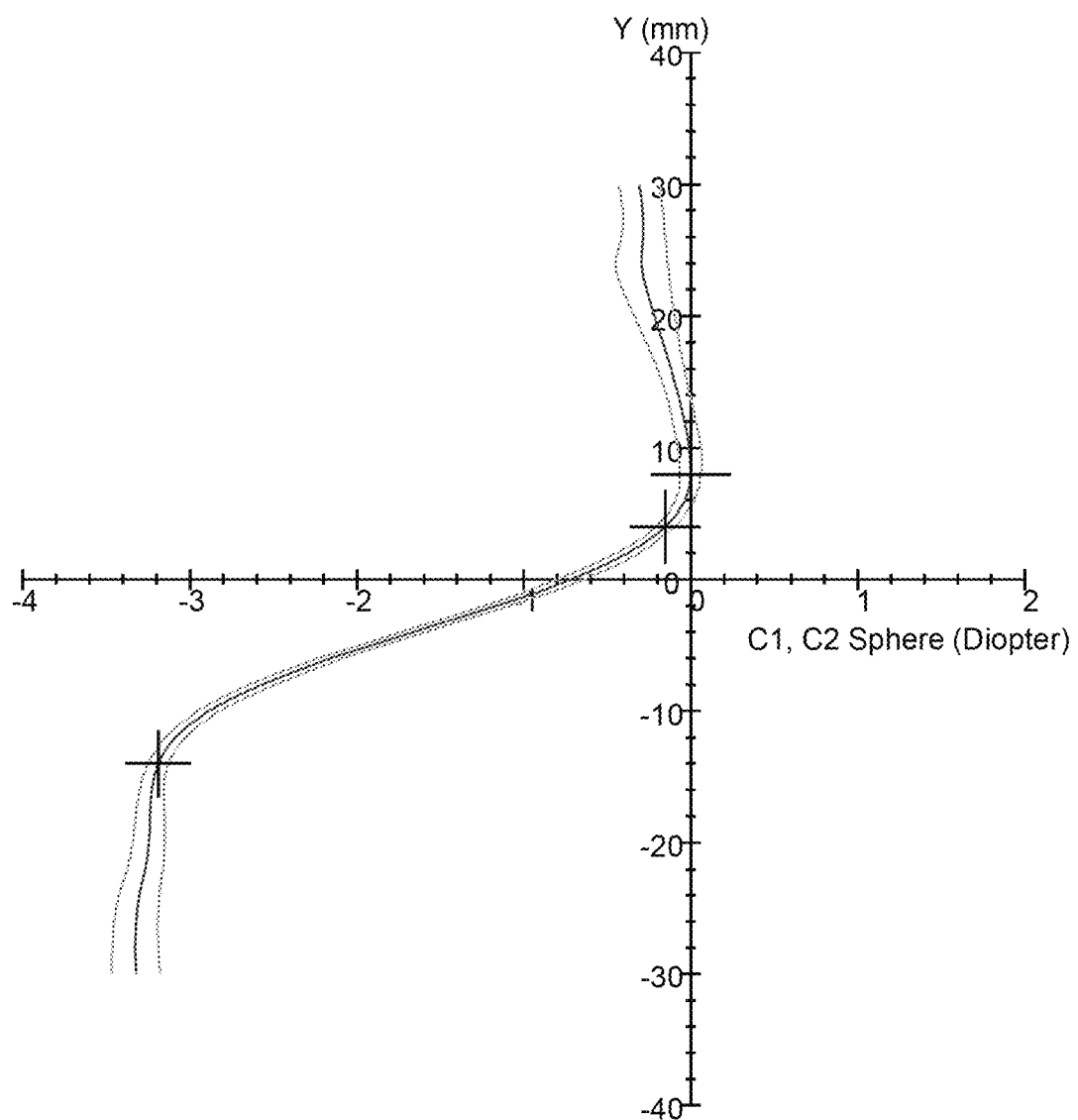
Figure 16B:
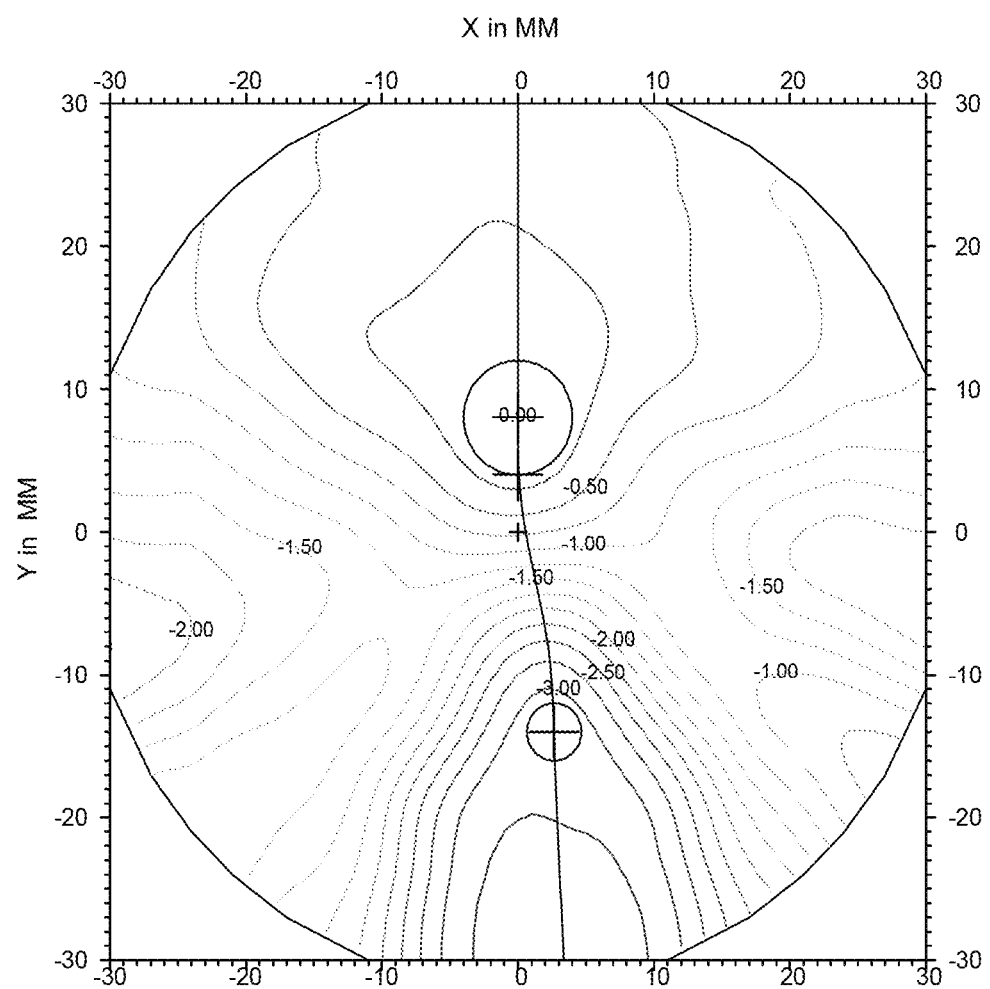
Figure 16C:
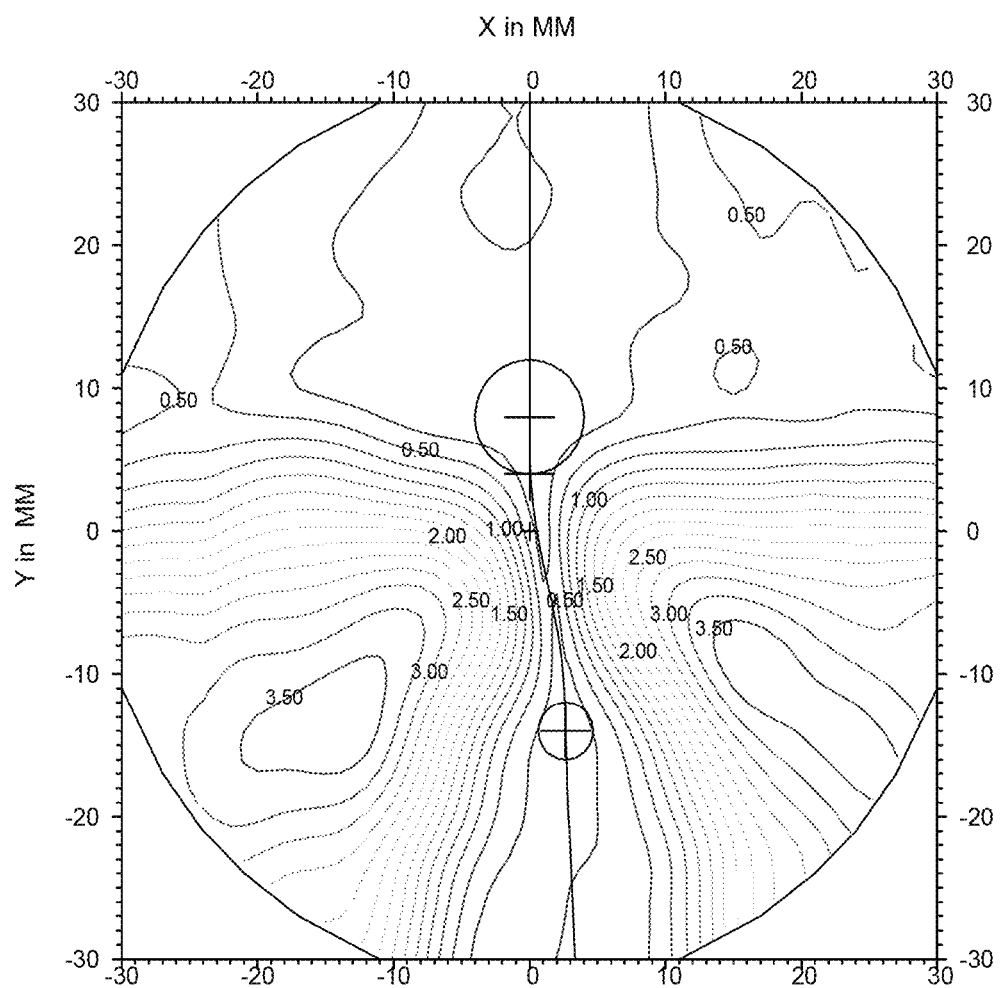

FIGS. 16a to 16c show the back surface of the modified IPSEO3™ corresponding to the rear surface of the IPSEO3™ lens combined with the modifying surface illustrated on FIGS. 14a to 14c.

FIG. 16a shows absolute values of mean sphere deviation curve surrounded by minimum and maximum sphere curves, along the meridian. Said sphere deviation expresses the difference between absolute value of the sphere and absolute value of the sphere at the far vision point. The x-axes are graduated in diopters, and the y-axes give the height, in mm, on the rear surface.

FIG. 16b shows lines of equal mean sphere, i.e. lines formed by points for which the mean sphere has an identical value. The x-axis and y-axis give the height, in mm respectively along the horizontal and vertical directions.

FIG. 16c shows, using the same axes as for FIG. 16b, lines of equal cylinder.

Figure 17A:
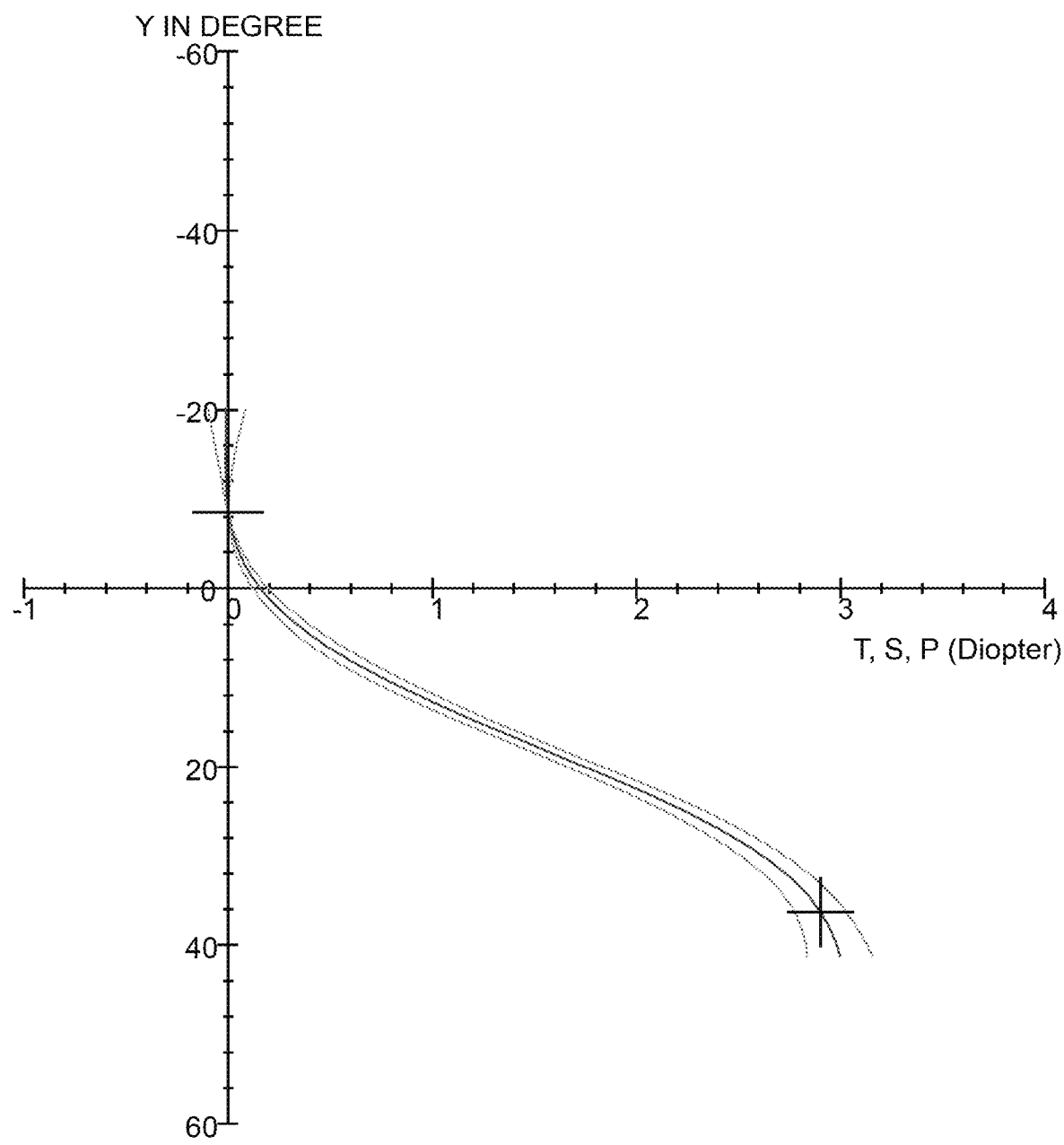
Figure 17B:
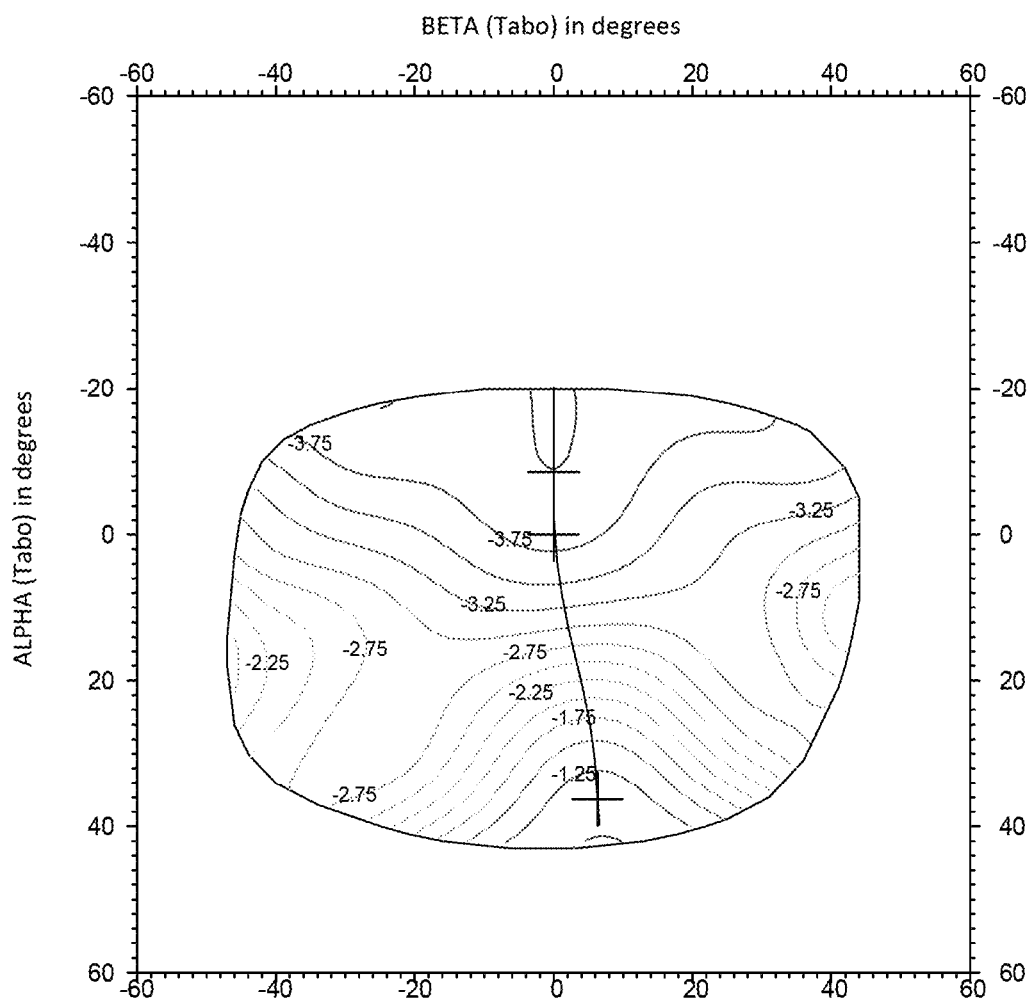
Figure 17C:
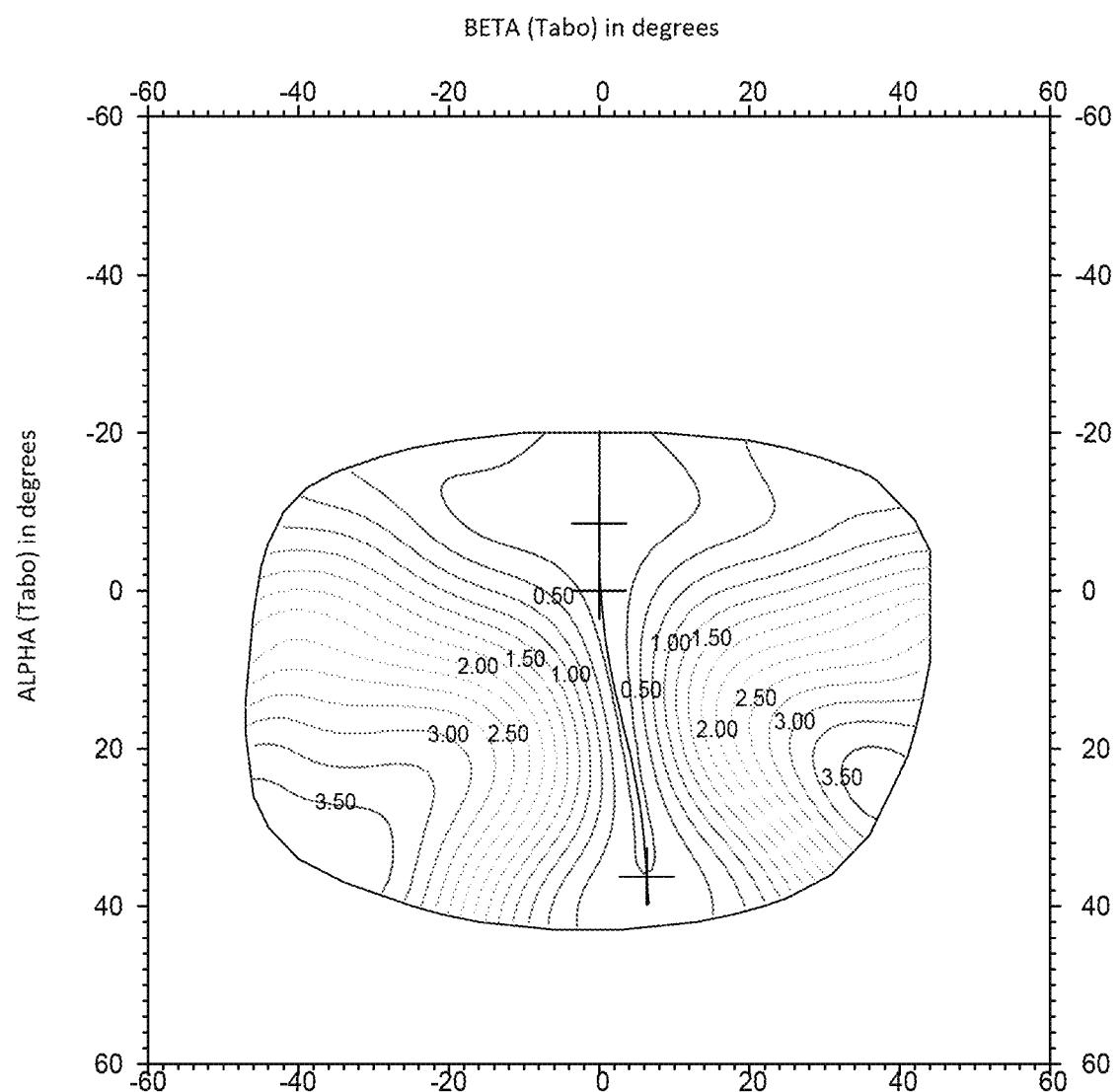

FIGS. 17a to 17c show the optical features of the modified progressive ophthalmic lens in previously defined standard wearing conditions.

FIG. 17a shows refractive power surrounded by minimum and maximum refractive power, along the meridian. The x-axes are graduated in diopters, and the y-axes give the gaze direction inclination, in degrees.

FIG. 17b shows lines of equal power, i.e. lines formed by points for which power has an identical value. The x-axis and y-axis respectively give the angles [α] and [β].

FIG. 17c shows, using the same axes as FIG. 17b, lines of equal astigmatism.

For FIGS. 17a-17c, the (0,0) point corresponds to the gaze direction of the fitting cross about 4 mm from the prism reference point.

By comparing FIGS. 13a to 13C with FIGS. 17a to 17C, one can observe that the optical features of the initial optical lens are very close to the optical features of the modified optical lens.

Comparing the end to end distortion criteria, the inventors have observed a reduction of −7.5% to −28.8% from the nasal side of the modified lens to the temporal side of the modified lens.

Therefore, by adding the same modifying surface on the front and rear surfaces of the initial ophthalmic lens the distortion of the ophthalmic lens has been reduced while keeping substantially unchanged its initial dioptric function. The reduction of distortion requires no complex calculation such as an optical optimization.

The invention further relates to an ophthalmic lens determining device 30 adapted to implement a method according to the invention.

Figure 18:
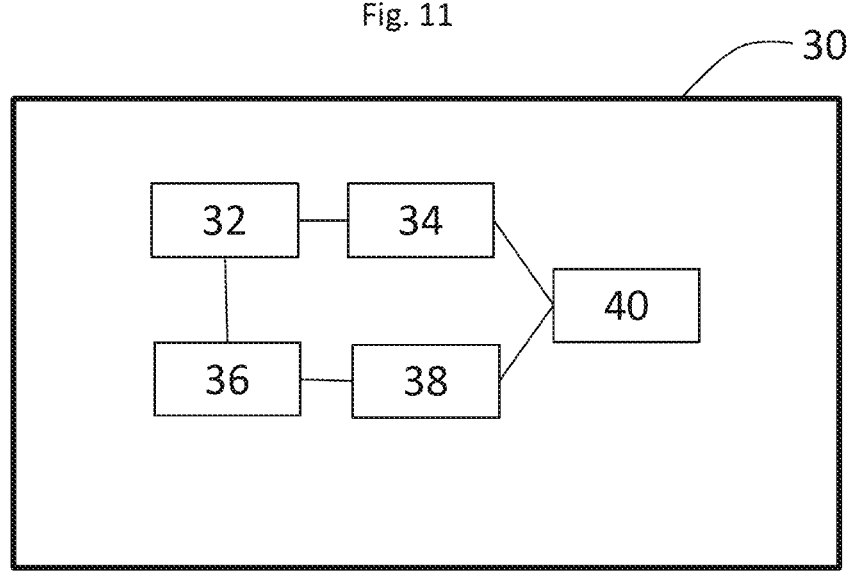
FIG. 18 is a schematic representation of an ophthalmic lens determining device according to the invention.

As illustrated on FIG. 18, the ophthalmic lens determining device comprises:
an order request receiving mean 32,
a surface determining mean 34,
a modifying surface determining mean 36,
a complementary modifying surface providing mean 38,
a calculation mean 40, The order request receiving mean 32 are adapted to receive an ophthalmic lens order request comprising at least the wearer's ophthalmic prescription and at least one non-dioptric function of said ophthalmic lens to modify.

The surface determining mean 34 is adapted to determine the surfaces and relative positions of said surfaces for an ophthalmic lens based on the order request, The modifying surface determining mean 36 is adapted to determine and provide at least one modifying surface (Smod) based on the one non-dioptric function to be modified.

The complementary modifying surface providing mean 38 is adapted to provide at least one complementary modifying surface (Sconmod).

The calculation mean 40 is adapted to add the at least one modifying surface (Smod) to one of the front and the rear surfaces of the ophthalmic lens and the complementary modifying surface (Sconmod) to the other of the front and rear surfaces so as to obtain a modified ophthalmic lens having substantially the same dioptric function as the ophthalmic lens.

According to a preferred embodiment, the ophthalmic lens determining device may further comprise communication mean adapted to communicate with at least one distant entity to provide the modifying surface (Smod) and/or the complementary modifying surface (Sconmod).

The invention further relates to a method of providing an ophthalmic lens adapted to a wearer comprising:
an wearer data providing step during which wearer data comprising at least the wearer's prescription is provided,
a dioptric design ordering step during which a dioptric design having a dioptric function corresponding at least to the wearer's prescription is ordered, at a lens designer side;
a dioptric design receiving step during which the ordered dioptric design is received;
an ophthalmic lens modifying step during which at least one non-dioptric parameter of the ophthalmic lens corresponding to the received dioptric design is modified according to the method of the invention, the optical system being an ophthalmic lens;
an ophthalmic lens providing step during which the modified ophthalmic lens is provided.

The modifying surface may be provided together with the dioptric design by the lens designer side, or provided by a third party or determined upon reception of the dioptric design, for example based on the semi-finished lens blank available.

The invention has been described above with the aid of embodiments without limitation of the general inventive concept. In particular although the invention has been described using at least one progressive addition surface, the invention may be implemented with a bifocal lens.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented by processing circuitry for modifying a non-dioptric parameter of an optical system comprising a first and a second surface, the method comprising:
modifying the first surface and second surface so as to obtain a modified optical system such that a dioptric function of the modified optical system is a same as a dioptric function of the optical system, wherein the modifying comprises
 obtaining data indicative of the optical system, the data comprising at least data of the first surface and the second surface and data indicative of a relative position of the first surface and the second surface,
 determining at least one modifying surface, the at least one modifying surface being determined based on a non-dioptric function to be modified,
 determining for each of the at least one modifying surface a complementary modifying surface identical to the at least one modifying surface, and
 adding the at least one modifying surface to one of the first surface and the second surface of the optical system and adding the complementary modifying surface to the other of the first surface and the second surface so as to obtain the modified optical system.

2. The method according to claim 1, wherein the complementary modifying surface is determined so that the modified optical system has the same dioptric function as the optical system.

3. The method according to claim 1, further comprising modifying the complementary modifying surface so that the modified optical system has the same dioptric function as the optical system.

4. The method according to claim 1, further comprising, after the adding, comparing the at least one non-dioptric modified parameter to a target value, wherein the determining of the at least one modifying surface, the determining of the complementary modifying surface, and the adding of the at least one modifying surface and the complementary modifying surface are repeated so as to decrease the non-dioptric modified parameter.

5. The method according to claim 1, wherein the non-dioptric parameter is selected from a list consisting of an overall optical distortion of the optical system, local optical distortion of the optical system, a thickness of the optical system, and a geometry of at least one of the first surface and the second surface of the optical system.

6. The method according to claim 1, wherein the optical system is a semi-finished lens blank having a finished surface and a non-finished surface, the non-dioptric parameter being a geometry of the finished surface imposed to the first surface.

7. A method implemented by processing circuitry for modifying at least one non-dioptric binocular parameter of a pair of optical lenses, wherein the non-dioptric parameter of each optical lens of the pair of optical lenses is modified using the method according to claim 1.

8. A method of manufacturing an ophthalmic lens comprising:
 determining surfaces of the ophthalmic lens and relative positions of front and rear surfaces of the ophthalmic lens; and
 manufacturing the ophthalmic lens,
 wherein during the determining, at least one non-dioptric parameter of the ophthalmic lens is modified according to the method of claim 1.

9. The method of manufacturing the ophthalmic lens according to claim 8, wherein the manufacturing comprises providing and sticking at least one transparent patch having a surface corresponding to the at least one modifying surface or the complementary modifying surface on the corresponding surface of the ophthalmic lens.

10. A method of providing an ophthalmic lens adapted to a wearer, the method comprising:
 obtaining wearer data comprising at least a wearer's prescription;
 ordering a dioptric design having a dioptric function corresponding at least to the wearer's prescription, at a lens designer side;
 receiving the ordered dioptric design;
 modifying at least one non-dioptric parameter of the ophthalmic lens corresponding to the received dioptric design according to the method of claim 1, the optical system being the ophthalmic lens, the at least one modifying surface being determined based on the non-dioptric function to be modified; and
 providing the modified ophthalmic lens.

11. An ophthalmic lens for correcting a user's vision, the ophthalmic lens comprising:
 a first major surface; and
 a second major surface, wherein
 the first major surface is a composite surface comprising a first surface and at least one modifying surface,
 the second major surface is a composite surface comprising a second surface and at least one complementary modifying surface, the first surface and the second surface defining an optical system having information associated therewith, the information comprising at least information of the first surface and the second surface and of a relative position of the first surface and the second surface, the at least one modifying surface and the at least one complementary modifying surface being defined such that a dioptric function of the optical system is a same as a dioptric function of the ophthalmic lens, and
 the at least one modifying surface being selected from a list of existing modifying surfaces that have been optimized to modify a specific non-dioptric parameter of the optical system.

12. An ophthalmic lens determining device comprising:
 processing circuitry; and
 a memory storing instructions that when executed by the processing circuitry cause the processing circuitry to perform
  receiving an ophthalmic lens order request comprising at least a wearer's ophthalmic prescription and at least one non-dioptric function of the ophthalmic lens to modify,
  determining surfaces and relative positions of the surfaces for an ophthalmic lens based on the order request,
  determining at least one modifying surface based on the at least one non-dioptric function to be modified, and
  adding the at least one modifying surface to one of front and rear surfaces of the ophthalmic lens and a complementary modifying surface to the other of the front and rear surfaces so as to obtain a modified ophthalmic lens having a same dioptric function as the ophthalmic lens.

13. The ophthalmic lens determining device according to claim 12, wherein the instructions when executed by the processing circuitry cause the processing circuitry to perform communicating with at least one distant entity to provide the at least one modifying surface and/or the complementary modifying surface.

* * * * *